US007590856B2

(12) United States Patent
Morino et al.

(10) Patent No.: US 7,590,856 B2
(45) Date of Patent: Sep. 15, 2009

(54) SYSTEM FOR MANAGING LICENSE FOR PROTECTING CONTENT, SERVER FOR ISSUING LICENSE FOR PROTECTING CONTENT, AND TERMINAL FOR USING CONTENT PROTECTED BY LICENSE

(75) Inventors: Harumi Morino, Yokohama (JP); Masataka Okayama, Fujisawa (JP); Akira Tanaka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 511 days.

(21) Appl. No.: 10/695,882

(22) Filed: Oct. 30, 2003

(65) Prior Publication Data
US 2005/0033967 A1  Feb. 10, 2005

(30) Foreign Application Priority Data
Aug. 5, 2003  (JP) ............................. 2003-205893

(51) Int. Cl.
*G06F 21/00* (2006.01)
(52) U.S. Cl. ...................... 713/182; 713/171; 713/189; 380/277; 380/278; 705/59; 705/71; 709/203; 709/229; 726/26; 726/27; 726/28; 726/29; 726/30; 726/31; 726/32; 726/33
(58) Field of Classification Search ......... 380/277–278; 705/71, 59; 713/171, 182, 189; 726/1–36; 709/229, 203
See application file for complete search history.

(56) References Cited

U.S. PATENT DOCUMENTS 6,708,157 B2 *   3/2004  Stefik et al. ................... 705/59
6,915,278 B1 *   7/2005  Ferrante et al. ............... 705/59
7,395,245 B2     7/2008  Okamoto et al.
2002/0007351 A1* 1/2002  Hillegass et al. .............. 705/59
2002/0107806 A1* 8/2002  Higashi et al. ................ 705/51
2003/0005135 A1* 1/2003  Inoue et al. .................. 709/229
2003/0140009 A1* 7/2003  Namba et al. ................ 705/59
2004/0034786 A1* 2/2004  Okamoto et al. ............. 713/189

(Continued)

FOREIGN PATENT DOCUMENTS

JP        10-222428        8/1998

(Continued)

OTHER PUBLICATIONS

Japanese Office Action, with English Translation, issued in Japanese Patent Office issued in Japanese Patent Application No. JP 2003-205893 dated on Jul. 22, 2008.

*Primary Examiner*—Christian LaForgia
*Assistant Examiner*—Kari L Schmidt
(74) *Attorney, Agent, or Firm*—McDermott Will & Emery LLP

(57) ABSTRACT

A license server 1 comprises: a license table for managing licenses purchased by users; a communication control section 20 for transmitting/receiving data through a communications network 3; an authentication control section 22 for performs authentication processing for a terminal 2; an encryption/decryption control section 21 for encrypting/decrypting communications with the terminal 2; an issued temporary license information table 13 for storing information on issued temporary licenses; and a return control section 24 for returning a temporary license and then deleting the information on the temporary license stored in the issued temporary license information table 13.

18 Claims, 18 Drawing Sheets

U.S. PATENT DOCUMENTS

2004/0044901 A1* 3/2004 Serkowski et al. .......... 713/200
2004/0162786 A1* 8/2004 Cross et al. .................. 705/59
2004/0193680 A1* 9/2004 Gibbs et al. ................. 709/203
2005/0071280 A1* 3/2005 Irwin et al. .................. 705/59

FOREIGN PATENT DOCUMENTS

| JP | P2002-288448 A | 10/2002 |
| JP | 2003-058660 | 2/2003 |
| JP | 2003-76805 | 3/2003 |

* cited by examiner

FIG.2A

| | | |
|---|---|---|
| 501 | LICENSE ID | LID5 |
| 502 | USER ID | UID1 |
| 503 | CONTENT ID | CID1 |
| 504 | EXPIRATION DATE/TIME | 2002/12/1 23:59 |
| 505 | NUMBER OF REPRODUCTION OPERATIONS | 5 |
| 506 | NUMBER OF SIMULTANEOUS ISSUES | 2 |
| 507 | RETURN FLAG | AUTOMATIC RETURN |
| 508 | CONTENT KEY | Kc1 |

| | | |
|---|---|---|
| 511 | LICENSE ID | LID5 |
| 512 | CONTENT ID | CID1 |
| 513 | EXPIRATION-DATE/TIME REJECT FLAG | 0 |
| 514 | NUMBER-OF-REPRODUCTION-OPERATIONS REJECT FLAG | 1 |
| 515 | RETURN-FLAG REJECT FLAG | 1 |
| 516 | REQUESTED TERMINAL EXPIRATION DATE/TIME | 2002/12/7 7:00 |
| 517 | REQUESTED NUMBER OF TERMINAL REPRODUCTION OPERATIONS | 3 |
| 518 | REQUESTED TERMINAL RETURN FLAG | AUTOMATIC RETURN |

| | | |
|---|---|---|
| 521 | LICENSE ID | LID5 |
| 522 | USER ID | UID1 |
| 523 | CONTENT ID | CID1 |
| 524 | EXPIRATION DATE/TIME | 2002/12/1 23:59 |
| 525 | NUMBER OF REPRODUCTION OPERATIONS | 2 |
| 526 | NUMBER OF SIMULTANEOUS ISSUES | 1 |
| 527 | RETURN FLAG | AUTOMATIC RETURN |
| 528 | CONTENT KEY | Kc1 |

| | | |
|---|---|---|
| 531 | LICENSE ID | LID5 |
| 532 | TEMPORARY LICENSE ID | SLD1 |
| 533 | CONTENT ID | CID1 |
| 534 | TERMINAL EXPIRATION DATE/TIME | 2002/11/25 23:59 |
| 535 | NUMBER OF TERMINAL REPRODUCTION OPERATIONS | 3 |
| 536 | TERMINAL RETURN FLAG | AUTOMATIC RETURN |
| 537 | CONTENT KEY | Kc1 |

| LICENSE ID /1301 | TEMPORARY LICENSE ID /1302 | TERMINAL EXPIRATION DATE/TIME /1303 | TERMINAL RETURN FLAG /1304 | TERMINAL ID /1305 |
|---|---|---|---|---|
| LID1 | SLID1 | 2002/11/20 23:59 | AUTOMATIC RETURN | TERMINAL ID 1 |
| LID2 | SLID1 | 2002/11/26 10:00 | RETURN REQUIRED | TERMINAL ID 1 |
| LID2 | SLID2 | 2002/11/20 23:59 | RETURN REQUIRED | TERMINAL ID 2 |
| .. | .. | | .. | .. |
| LIDn | SLIDk | 2002/12/1 23:59 | AUTOMATIC RETURN | TERMINAL ID i |

FIG.6A

| | |
|---|---|
| 701 ~ LICENSE ID | LID5 |
| 702 ~ USER ID | UID1 |
| 703 ~ CONTENT ID | CID1 |
| 704 ~ EXPIRATION DATE/TIME | 2002/12/1 23:59 |
| 705 ~ NUMBER OF REPRODUCTION OPERATIONS | 2 |
| 706 ~ NUMBER OF SIMULTANEOUS ISSUES | 1 |
| 707 ~ RETURN FLAG | AUTOMATIC RETURN |
| 708 ~ CONTENT KEY | Kc1 |

| | |
|---|---|
| 711 ~ LICENSE ID | LID5 |
| 712 ~ TEMPORARY LICENSE ID | SLID1 |
| 713 ~ CONTENT ID | CID1 |
| 714 ~ TERMINAL EXPIRATION DATE/TIME | 2002/11/25 23:59 |
| 715 ~ NUMBER OF TERMINAL REPRODUCTION OPERATIONS | 1 |
| 716 ~ TERMINAL RETURN FLAG | AUTOMATIC RETURN |
| 717 ~ CONTENT KEY | Kc1 |

| | |
|---|---|
| 721 ~ LICENSE ID | LID5 |
| 722 ~ USER ID | UID1 |
| 723 ~ CONTENT ID | CID1 |
| 724 ~ EXPIRATION DATE/TIME | 2002/12/1 23:59 |
| 725 ~ NUMBER OF REPRODUCTION OPERATIONS | 3 |
| 726 ~ NUMBER OF SIMULTANEOUS ISSUES | 2 |
| 727 ~ RETURN FLAG | AUTOMATIC RETURN |
| 728 ~ CONTENT KEY | Kc1 |

| LICENSE ID 1301 | TEMPORARY LICENSE ID 1302 | TERMINAL EXPIRATION DATE/TIME 1303 | TERMINAL RETURN FLAG 1304 | TERMINAL ID 1305 | AUTOMATIC RETURN COMPLETION FLAG 1306 |
|---|---|---|---|---|---|
| LID1 | SLID1 | 2002/11/20 23:59 | AUTOMATIC RETURN | TERMINAL ID 1 | '0' |
| LID2 | SLID1 | 2002/11/26 10:00 | RETURN REQUIRED | TERMINAL ID 1 | '0' |
| LID2 | SLID2 | 2002/11/20 23:59 | RETURN REQUIRED | TERMINAL ID 2 | '1' |
| .. | .. | .. | .. | .. | .. |
| LIDn | SLIDk | 2002/12/1 23:59 | AUTOMATIC RETURN | TERMINAL ID i | '0' |

CONDITION 1:
 RETURN INHIBIT SETTING FLAG= " BOTH ACCEPTABLE" OR
(RETURN INHIBIT REQUEST FLAG = " 0" AND RETURN INHIBIT
SETTING FLAG= " RETURN REQUIRED") OR
(RETURN INHIBIT REQUEST FLAG= "1" AND RETURN INHIBIT
SETTING FLAG= " RETURN INHIBITED")

CONDITION 1:
AUTOMATIC RETURN SETTING FLAG= " BOTH ACCEPTABLE" OR
(AUTOMATIC RETURN REQUEST FLAG= " 0" AND AUTOMATIC
RETURN SETTING FLAG= " AUTOMATIC RETURN NOT
PERMITTED") OR
(AUTOMATIC RETURN REQUEST FLAG= "1" AND AUTOMATIC
RETURN SETTING FLAG= " AUTOMATIC RETURN PERMITTED")

FIG.16

| ISSUED TEMPORARY LICENSE | TERMINAL ID | AUTOMATIC RETURN COMPLETION FLAG |
|---|---|---|
| ISSUED TEMPORARY LICENSE 1 | TERMINAL ID 1 | '0' |
| ISSUED TEMPORARY LICENSE 2 | TERMINAL ID 1 | '0' |
| ISSUED TEMPORARY LICENSE 3 | TERMINAL ID 2 | '1' |
| ⋮ | ⋮ | ⋮ |
| ISSUED TEMPORARY LICENSE d | TERMINAL ID i | '0' |

FIG.19

ENTER TEMPORARY LICENSE
REQUEST INFORMATION

EXPIRATION DATE/TIME TO BE REQUESTED
2002/12/20/ 23:59

NUMBER OF REPRODUCTION OPERATIONS
TO BE REQUESTED 2

AUTOMATIC RETURN REQUEST

RETURN INHIBIT REQUEST

OK

SYSTEM FOR MANAGING LICENSE FOR PROTECTING CONTENT, SERVER FOR ISSUING LICENSE FOR PROTECTING CONTENT, AND TERMINAL FOR USING CONTENT PROTECTED BY LICENSE

BACKGROUND OF THE INVENTION

The present invention relates to a technique for protecting copyrighted content by use of a license, and more particularly to an apparatus and a system for managing temporary licenses for content between a server and terminals.

Services have been proposed for delivering content such as movies and music through communication means such as the Internet and satellite broadcasting. Data handled by such a system is digitized and therefore is easy to duplicate, making it important to protect the copyrighted content. One proposed method for such protection is to encrypt the content before distributing it. For example, the content is encrypted through the public key cryptosystem, and at the same time, a decryption key is created for use to decrypt the encrypted content. Since the encrypted content cannot be reproduced without the corresponding decryption key, the decryption key and its use conditions may be managed as a pair, or a license, to prevent unauthorized use of the content and thereby protect the right of the content author, etc.

Japanese Patent Laid-open No. 2002-288448 discloses a system for reproducing content at a plurality of terminals owned by users, wherein after a license managed by the server is transmitted to a terminal, if the terminal has finished using the license, the license is deleted from the terminal or it is returned to the server so that the license can be transmitted to another terminal.

In content delivery service using the above copyright protection technique, it is important to employ a method capable of securely managing the delivered content licenses at the terminals.

In the above prior art technique, content data is encrypted, and a decryption key for decrypting the data and the use conditions of the key (hereinafter collectively referred to as a license) are used to protect the copyright. In this system, the license use conditions transmitted from the server to terminals are the same as those managed or held by the server, making it impossible to change the use conditions for each terminal. For example, a license including a "consumptive type" use condition whose value is updated at a terminal, such as the maximum allowable number of content reproduction operations, cannot be transmitted to a plurality of terminals at the same time.

Further, once transmitted to a terminal, a license must be returned to the server before transmitting it to another terminal, making it necessary that the server and the terminal (an apparatus or a memory device storing the license) communicate with each other when the license is returned. This means that the server must be aware of at which terminal the user has stored the license, which is inconvenient.

Still further, since each license transmitted to a terminal is managed by only attaching a flag to the corresponding license managed by the server, it is impossible to support the case where the use conditions vary at different terminals.

SUMMARY OF THE INVENTION

An object of the present invention is to provide a license management system, a server, and a terminal for returning a license offline (that is, without any communications between the server and the terminal).

Another object of the present invention is to provide a license management system, a server, and a terminal capable of selecting a method for returning a license based on the type of terminal.

Still another object of the present invention is to provide a license management system, a server, and a terminal capable of restoring license data when the data has been damaged due to a terminal failure, etc.

To accomplish the above objects, a license management system of the present invention comprises: means (e.g., a license table) for managing a first license purchased by a user; communication means for transmitting/receiving data through a communication network such as a public network (an optical circuit, a CATV network, a telephone line) or a private communication network or a home network; means for performing authentication processing for a terminal; means for encrypting/decrypting communications with the terminal; means (e.g., an issued temporary license information table) for storing information on issued second licenses (e.g., temporary licenses); means for returning a second license; and means, when the second license has been returned, for deleting the information on the second license stored in the means for storing information on issued second licenses.

Further in the above license management system, each second license includes return mode information, and the terminal includes means for selecting a return mode and requesting the selected return mode to be established.

Still further, a server in the above license management system includes means for automatically returning or retrieving a second license.

Still further, the server in the above license management system further includes means for inhibiting the terminal from returning a second license.

Still further in the above license management system, the above means for storing information on issued licenses includes means for storing issued second licenses and means for restoring a second license issued from the means for storing second licenses to a terminal.

The present invention can return a license offline (that is, without any communications between the server and the terminal), making it possible to reduce the burden on content users.

The present invention can select a method for returning a license based on the type of terminal, thereby enhancing the usability for content users.

The present invention can restore license data when it has been damaged due to a terminal failure, etc., reducing the loss suffered by the content user.

BRIEF DESCRIPTION OF THE DRAWINGS

FIGS. 2A to 2D illustrate generation of a temporary license in the license distribution system of the embodiment.

FIG. 5 is a diagram showing an issued temporary license information table according to the embodiment.

FIGS. 6A to 6C illustrate return of a temporary license in the license distribution system of the embodiment.

FIG. 9 is a diagram showing another issued temporary license information table according to the embodiment.

FIG. 16 is a diagram showing still another issued temporary license information table according to the embodiment.

FIG. 19 is a diagram showing input temporary license acquisition request information according to the embodiment.

DETAILED DESCRIPTION OF THE PREFERRED EMBODIMENTS OF THE INVENTION

Figure 1:
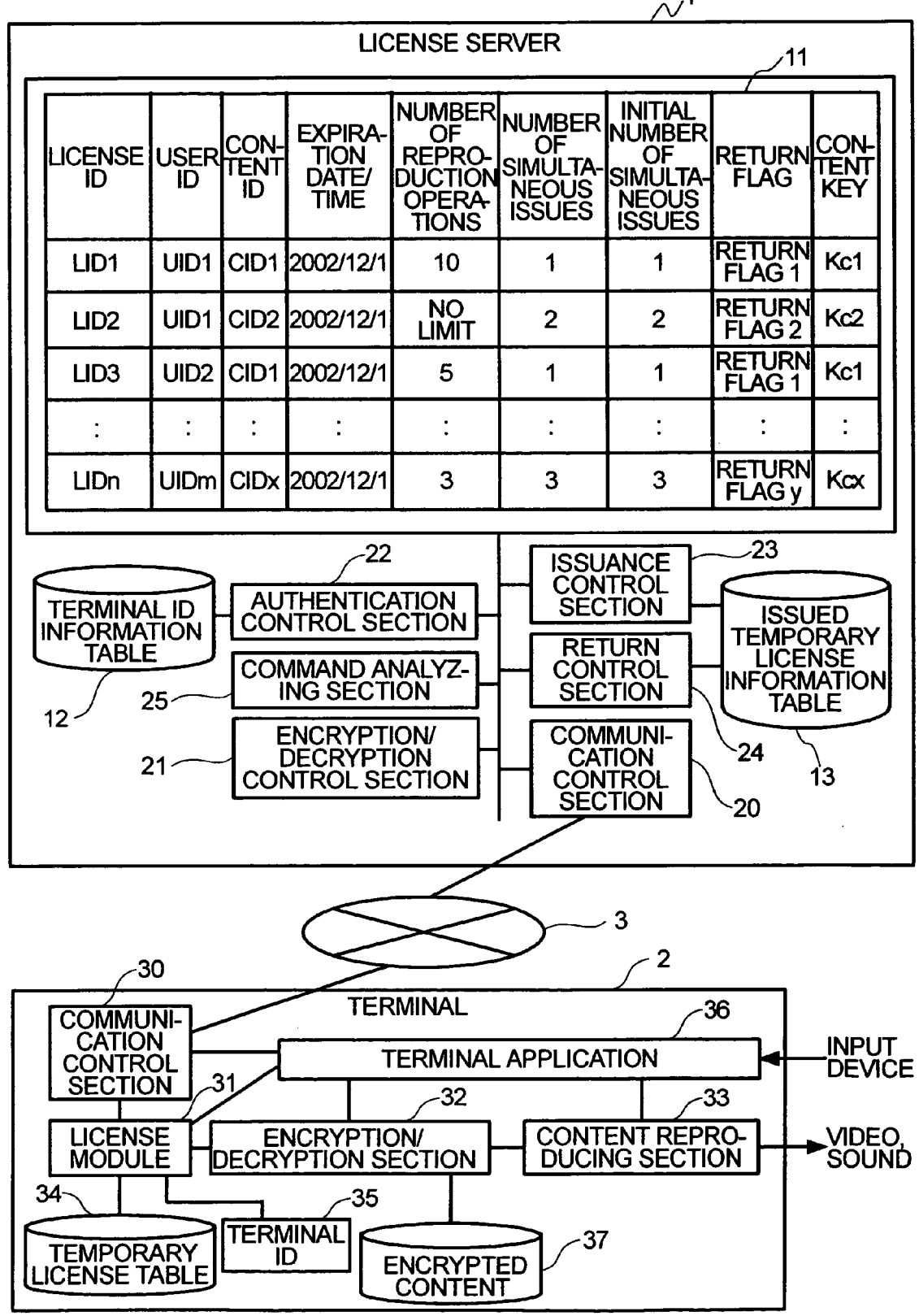
FIG. 1 is a diagram showing a configuration of a license distribution system according to an embodiment of the present invention.

FIG. 1 is a diagram showing a configuration of a license management system to which a license management method according to an embodiment of the present invention can be applied.

Referring to FIG. 1, reference numeral 1 denotes a license server; numeral 11 denotes a license table for storing licenses that can be used by users; numeral 12 references a terminal ID information table for storing IDs identifying terminals and information on their users; and numeral 13 denotes an issued temporary license information table for storing issuance information on temporary licenses generated from the license table 11. A communication control section 20 is connected to a wired or wireless public communication network or to a private communication network for communicating with terminals, such as the exemplary terminal 2. An encryption/decryption control section 21 performs encryption/description processing on a temporary license when exchanging it with a terminal 2. An authentication control section 22 determines a user ID, based on a terminal ID identifying a terminal to perform authentication processing. An issuance control section 23 issues a temporary license based on a license stored in the license table 11. A return control section 24 updates a license stored in the license table 11, when a temporary license has been returned from a terminal 2. A communication network 3, such as a wired or wireless public communication network or private communication network, connects the server 1 to a terminal 2.

In the terminal 2, communication control section 30 connects to the network 3 for communicating with the license server 1. A license module 31 obtains, returns, and manages a temporary license. An encryption/decryption section 32 is provided for decrypting encrypted content, by use of a content key included in a temporary license. A content reproduction section 33 reproduces decrypted content. A temporary license table 34 stores temporary licenses. A terminal An ID 35 identifies each terminal 2. A terminal application 34 controls the terminal 2. Encrypted content 37 may be locally stored. The license table 11, the terminal ID information table 12, the issued temporary license information table 13, the temporary license table 34, and the encrypted content 37 are stored in a rewritable storage device. The terminal IDs 35, on the other hand, are stored in a non-rewritable storage device.

First of all, the terminal 2 accesses the license server 1 through the communication network 3 to obtain a temporary license which includes a content key necessary to reproduce encrypted content. Since this access might be intercepted by a third party on the communication network 3, the server 1 and the terminal 2 must apply encryption to maintain a secure communication. It should be noted, however, that encryption is not required if there is no possibility of interception by a third party, for example, if the communication network is a private line. Through the encrypted secure communication, the license module 31 in the terminal 2 transmits a session initiation command which includes a terminal ID 35 identifying the terminal 2.

In the license server 1, the encryption/decryption control section 21 decrypts the encrypted session initiation command received by the communication control section 20 from the terminal 2. The command analyzing section 25 analyzes the command, obtaining the terminal ID 35. Then, the authentication control section 22 checks whether the terminal ID 35 is registered, and obtains the user ID from the information stored in the terminal ID information table 12. The authentication control section 22 checks whether the obtained terminal ID 35 and user ID have been revoked, as necessary. If a valid terminal and a valid user have been identified at this step, a secure session is established between the license server 1 and the license module 31 in the terminal 2.

Then, the terminal 2 requests a necessary temporary license by specifying an originating license stored in the license table. At that time, the terminal 2 also specifies the required use conditions for the requested temporary license (for example, the expiration date/time, the maximum allowable number of content reproduction operations, and the reproduction time) and transmits a temporary license acquisition command to the license server 1 after encrypting it. In the license server 1, the encryption/decryption control section 21 decrypts the encrypted temporary license acquisition command received through the communication control section 20, and then the command analyzing section 25 transmits the decrypted temporary license acquisition command to the issuance control section 23. From the temporary license acquisition command, the issuance control section 23 identifies the originating license and obtains the use conditions for the temporary license, such as the requested expiration date/time and the requested maximum allowable number of content reproduction operations, and checks whether or not the values of these use conditions exceed the values of their corresponding use conditions of the originating license stored in the license table 11. If not, the issuance control section 23 creates the temporary license. At that time, the values of the "consumptive type" use conditions of the originating license, such as the maximum allowable number of content reproduction operations, stored in license table 11 are reduced by the values of their corresponding "consumptive type" use conditions of the temporary license. Furthermore, the maximum allowable number of simultaneous issues of the originating license is decremented by 1. For example, when a sublicense or a temporary license with its maximum allowable number of content reproduction operations set to 3 has been created from a license whose license ID is LID1 in the license table 11, the maximum allowable number of content reproduction operations of the originating license is reduced from 10 to 7 and the maximum allowable number of simultaneous issues is decremented from 1 to 0. The maximum allowable number of simultaneous issues of a license is the number of temporary licenses that can be issued from the license at the same time. That is, when the maximum allowable number of simultaneous issues of a license has been reduced to 0, no more temporary license can be issued. Therefore, it is preferable to inhibit further issuance (creation) of a temporary license in this state. Thus, in the case where the maximum allowable number of simultaneous issues of a license is 0, copying of the license, namely, creation of a temporary license from it is inhibited. When the temporary license is transmitted to the terminal 2, information on the issued temporary license is stored in the issued temporary license information table 13. The temporary license is transmitted to the terminal 2 through the communication control section 20 as a response to the temporary license acquisition command after it is encrypted by the encryption/decryption control section 21. The license table 11 contains at least one of three use conditions: the expiration date/time, the maximum allowable number of content reproduction operations, and the maximum allowable number of simultaneous issues. The initial maximum allowable number of simultaneous issues and the return flag may be omitted from the license table 11.

In the terminal 2, the license module 31 receives the encrypted temporary license through the communication control section 30 as a response to the temporary license acquisition command. The encrypted temporary license is decrypted and then stored in the temporary license table 34. If users can directly access the temporary license, the temporary license is encrypted before it is stored.

Then, when a reproduction command has been entered through an input device such as a remote controller or a mouse, the terminal application 36 instructs the encryption/decryption section 32 to issue a reproduction permission request to the license module 31. In response, the license module 31 obtains the requested temporary license from the temporary license table 34 and transmits the content key and the use conditions to the encryption/decryption section 32 which then decrypts the encrypted content 37 by use of the obtained content key. The decrypted content is reproduced by the content reproducing section 33, and the reproduced content is output. When the value of one of the use conditions has been exceeded, the encryption/decryption section 32 stops further decryption of the content and abandons the content key.

When a stop command has been entered through an input device such as a remote controller or a mouse, the terminal application 36 instructs the encryption/decryption section 32 to stop decrypting the content. Then, the encryption/decryption section 32 abandons the content key and stops further decryption of the content, while the content reproducing section 33 stops the reproduction of the content. The content reproducing section 33 notifies the license module 31 of the actual use conditions such as the number of content reproduction operations actually performed, putting an end to the use of the content key. If the values of the given consumptive type use conditions of the temporary license have not been reached, the license module 31 subtracts the values of the actual consumptive type use conditions from them, and the resulting values are assigned to the temporary license as updated consumptive type use conditions.

If the temporary license is no longer needed, the terminal application 36 checks the return flag included in the temporary license by use of the license module 31 to determine whether the temporary license is to be returned. If the temporary license is to be returned, the terminal application 36 returns the temporary license to the license server 1 as a temporary license return command after encrypting it. At that time, if the secure session is no longer established, the terminal 2 first transmits a session initiation request command. If the return flag included in the temporary license indicates "return inhibited", the terminal 2 does not return the temporary license to the license server 1.

In the license server 1, the encryption/decryption control section 21 decrypts the temporary license return command received through the communication control section 20. Then, the command analyzing section 25 transmits the temporary license return command to the return control section 24. The return control section 24 identifies the originating license from the temporary license, and if there are "consumptive type" use conditions, such as the maximum allowable number of content reproduction operations, set for the temporary license, the return control section 24 adds the values of these use conditions to the values of the corresponding use conditions of the originating license. Furthermore, the maximum allowable number of simultaneous issues of the originating license is incremented by 1. If the maximum allowable number of simultaneous issues of the originating license is currently set at 0 and as a result, copying of the license is inhibited, it is preferable to remove this inhibition (inhibition of issuance, or creation, of temporary licenses). Further, the issued temporary license information table 13 is checked for the corresponding record or the record of the temporary license. If there is the corresponding record, it is deleted from the table.

Since the issued temporary license information table 13 stores information on the issued temporary licenses, this table may be checked regularly. Then, if there is a temporary license whose terminal expiration date/time has passed, its originating license is identified based on the license ID, and the maximum allowable number of simultaneous issues of the originating license in the license table 11 is incremented by 1. In this case, since the temporary license has not been returned, it is assumed that the values of the "consumptive type" use conditions set for the temporary license have been all reached and therefore the values of the use conditions of the originating license other than the maximum allowable number of simultaneous issues are not changed.

Thus, acquisition and return of temporary licenses are controlled such that temporary licenses whose expiration date/time has passed are automatically returned if their return flags are set at a value indicating automatic return. With this arrangement, the license server can carry out return processing on a temporary license issued to even a portable terminal, which is not always connected to the communication network. This enables users at other terminals to use the returned temporary licenses, which is convenient. Further, consider that a user has forgotten to return a temporary license and turned off the terminal. Even in such a case, the temporary license is conveniently automatically returned when its expiration date/time has passed, making it unnecessary for the user to take the trouble to turn on the terminal and return the temporary license.

Figure 3:
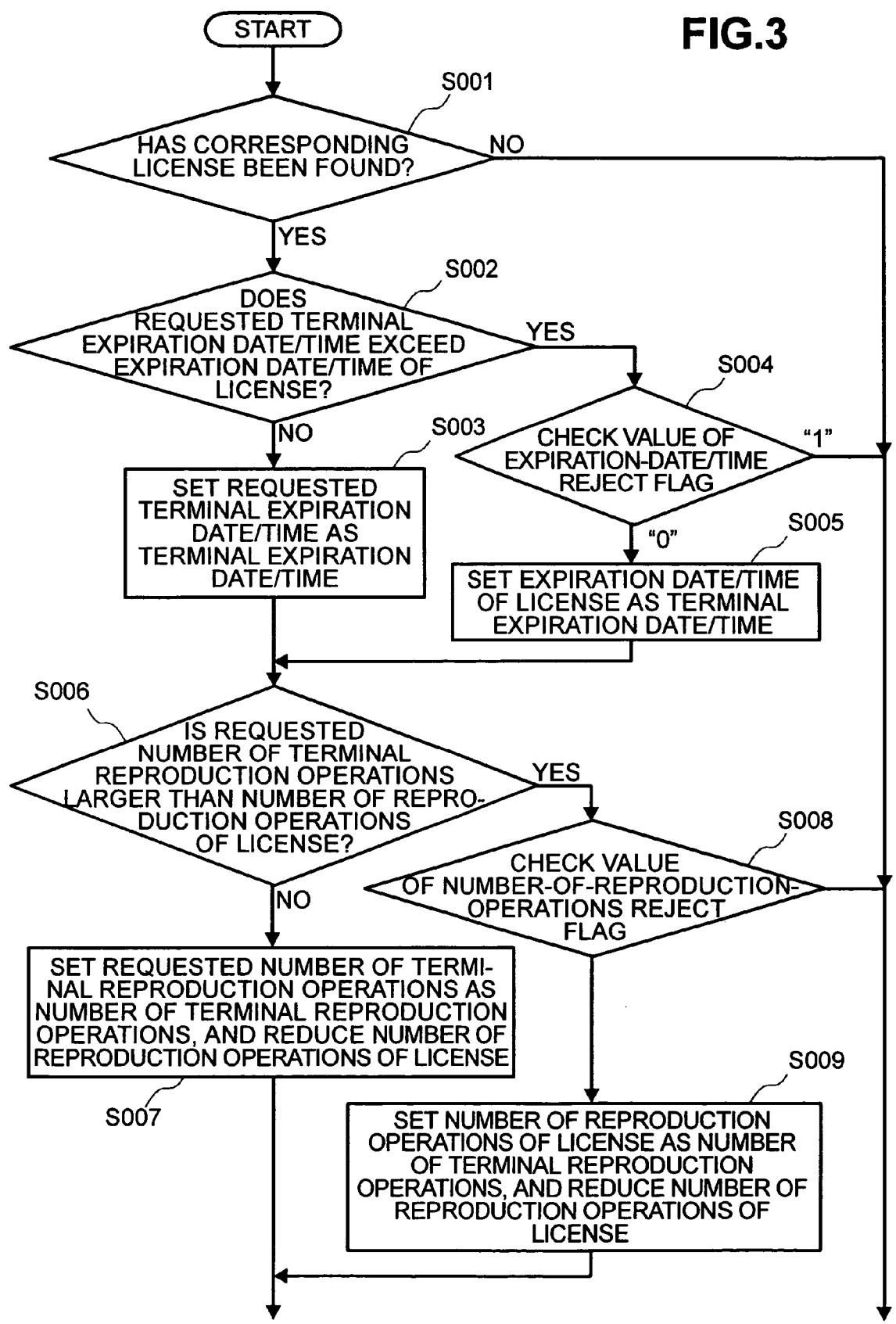
FIG. 3 is the first part of a flowchart showing an example of creation of a temporary license according to the embodiment.
Figure 4:
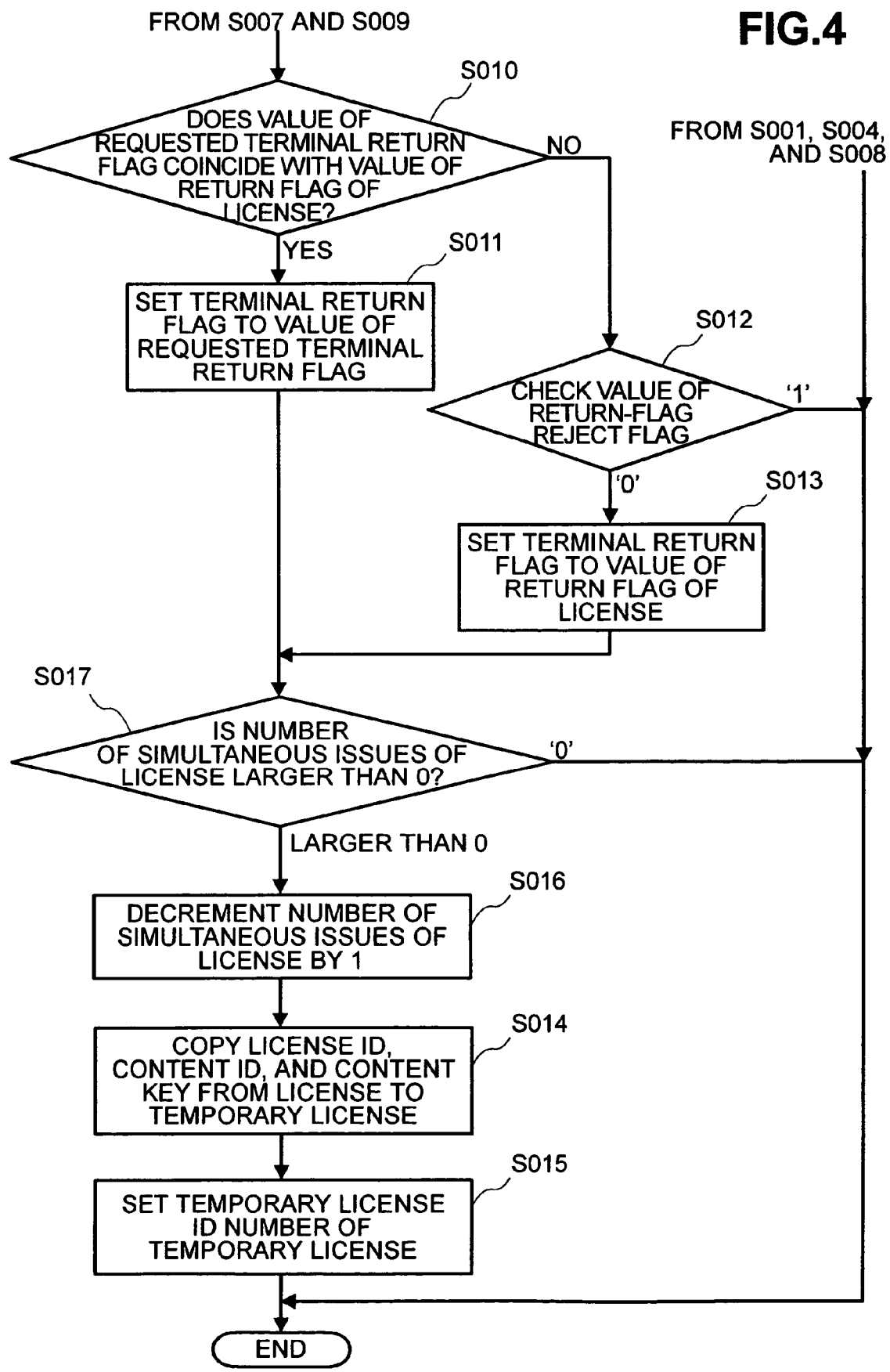
FIG. 4 is the second part of the above flowchart.

A description will below be made of an example of creation of a temporary license with reference to FIGS. 2A to 2D, 3, and 4. Referring to FIG. 2A, reference numeral 50 denotes a license stored in the license table of the license server before a temporary license is issued; 51 denotes temporary license acquisition request information included in a temporary license acquisition command; 52 denotes a license stored in the license table of the license server after the temporary license is issued; and 53 denotes the temporary license obtained by the terminal. FIGS. 3 and 4 together are a flowchart showing creation of a temporary license.

First of all, the issuance control section 23 analyzes the temporary license acquisition request information 51 included in a temporary license acquisition command transmitted from a terminal and searches the license table 11 for the record of the license whose license ID is LID 5, which is indicated by the temporary license acquisition request information 51, at step S001. If the record has been found, the issuance control section 23 checks whether the use conditions requested by the terminal can be set. If, on the other hand, the record has not been found, the processing ends without creating any temporary license.

Steps S002 to S005 set a terminal expiration date/time 534. Specifically, at step S002, the issuance control section 23 checks whether or not the requested terminal expiration date/time 516 included in the temporary license acquisition request information 51 exceeds the expiration date/time 504 of the license 50 set before the requested temporary license is issued. If not, the requested terminal expiration date/time 516 is set as the terminal expiration date/time 534 at step S003. If, on the other hand, the requested terminal expiration date/time 516 exceeds the expiration date/time 504, the expiration-date/time reject flag 513 is checked at step S004. The expiration-date/time reject flag 513 is set to "1" to indicate that issuance of a temporary license is to be rejected when the requested terminal expiration date/time 516 cannot be set for it. If the expiration-date/time reject flag 513 is set at "0", the expiration date/time 504 of the license 50 set before the requested temporary license is issued is set as the terminal expiration date/time 534 at step S005 since the requested terminal expiration date/time 516 cannot be set, indicating that a temporary license is to be issued. Accordingly, in the example of FIGS. 2A to 2D, since the requested terminal expiration date/time 516 (set at "12/2/2002, 7:00") exceeds the expiration date/time 504 (set at "12/1/2002, 23:59") and the expiration-date/time reject flag is set at "0", the terminal expiration date/time is set to "12/1/2002, 23:59" at step S005 in FIG. 3.

The maximum allowable number of terminal content reproduction operations 535 is a "consumptive type" use condition since it is decremented each time the content is reproduced. Steps S006 to S009 set the maximum allowable number of terminal content reproduction operations 535. Specifically, at step S006, the issuance control section 23 checks whether or not the requested maximum allowable number of terminal content reproduction operations 517 included in the temporary license acquisition request information 51 is larger than the maximum allowable number of content reproduction operations 505 of the license 50 set before the requested temporary license is issued. If not, the requested maximum allowable number of terminal content reproduction operations 517 is set as the maximum allowable number of terminal content reproduction operations 535 and the maximum allowable number of content reproduction operations 505 is reduced by the maximum allowable number of terminal content reproduction operations 535 at step S007. If the requested maximum allowable number of terminal content reproduction operations 517 is larger than the maximum allowable number of content reproduction operations 505, the number-of-reproduction-operations reject flag 514 is checked at step S008. The number-of-reproduction-operations reject flag 514 is set to "1" to indicate that issuance of a temporary license is to be rejected when the requested maximum allowable number of terminal content reproduction operations 517 cannot be set for it. If the number-of-reproduction-operations reject flag 514 is set at "0", the maximum allowable number of content reproduction operation 505 of the license 50 set before the requested temporary license is issued is set as the maximum allowable number of terminal content reproduction operations 535 of the temporary license at step S009 since the requested maximum allowable number of terminal content reproduction operations 517 cannot be set for it and the maximum allowable number of content reproduction operations 505 is reduced by the maximum allowable number of terminal content reproduction operations 535, indicating that the temporary license is to be issued. Accordingly, in the example of FIGS. 2A to 2D, since the requested maximum allowable number of terminal content reproduction operations 517 set at 3 is not larger than the maximum allowable number of content reproduction operations 505 set at 5, the maximum allowable number of terminal content reproduction operations 535 is set to 3 and the maximum allowable number of content reproduction operations 525 of the license 52 is to 2. The maximum allowable number of content reproduction operations 525 of the license 52 set after the temporary license is issued corresponds to the maximum allowable number of content reproduction operations 505 of the license 50 set before the temporary license is issued.

A terminal return flag 536 indicates either "automatic return" or "return required". Steps S010 to S013 set the terminal return flag 536. Specifically, at step S010, the value of the requested terminal return flag 518 included in the temporary license acquisition request information 51 is compared with the value of the return flag 507 of the license 50 set before the requested temporary license is issued. If they coincide with each other, the terminal return flag 536 is set to the value of the requested terminal return flag 518 at step S011. If, on the other hand, they do not coincide, the return-flag reject flag 515 is checked at step S012. The return-flag reject flag 515 is set to "1" to indicate that issuance of a temporary license is to be rejected when the terminal return flag 536 cannot be set to the value of the requested terminal return flag 518. If the return-flag reject flag 515 is set at "0", the terminal return flag 536 of the temporary license is set to the value of the return flag 507 of the license 50 set before the temporary license is issued at step S013 since the terminal return flag 536 of the temporary license cannot be set to the value of the requested terminal return flag 518, indicating that the temporary license is to be issued. Accordingly, in the example of FIGS. 2A to 2D since the value "automatic return" of the requested terminal return flag 518 coincides with the value "automatic return" of the return flag 507, the terminal return flag 536 is set to "automatic return" at step S011.

At step S017, the issuance control section 23 checks the maximum allowable number of simultaneous issues of the originating license. If the maximum allowable number of simultaneous issues of the license is already set at 0, the processing ends without issuing any temporary license since no more temporary licenses can be issued. If the maximum allowable number of simultaneous issues is larger than 0, the maximum allowable number of simultaneous issues 526 of the license 52 is set to a value obtained as a result of decrementing the maximum allowable number of simultaneous issues 506 of the license 50 by 1 at step S016. In the example of FIGS. 2A to 2D, since the maximum allowable number of simultaneous issues 506 of the license 50 is set at 2, the maximum allowable number of simultaneous issues 526 of the license 52 is set to 1.

At step S014, the license ID 531, the content ID 533, and the content key 537 of the temporary license to be issued 53 are set to the values of the license ID 501, the content ID 503, and the content key 508, respectively, of the license 50 set before the temporary license is issued.

At step S015, the temporary license ID 532 is set such that it is unique among the temporary licenses issued from the same license. This arrangement allows uniquely identifying any temporary license by use of the license ID 531 and the sublicense ID or temporary license ID 532.

Thus, the use conditions of a temporary license can be set such that the values of these use conditions do not exceed the values of their corresponding use conditions of the originating license managed by the license server 1, making it possible to issue a number of temporary licenses equal to the maximum allowable number of simultaneous issues of the originating license at most and thereby simultaneously reproduce the same content at a plurality of terminals.

A description will below be made of an example of the issued temporary license information table with reference to FIG. 5. The issuance control section 23 of the license server 1 creates a temporary license as described above and stores the following information in the issued temporary license information table 13 before transmitting the temporary license to the terminal. Specifically, the issuance control section 23 stores a license ID 1301 and a sublicense ID 1302 in the issued temporary license information table 13 to identify the temporary license. The license ID 1301 is also used to identify the originating license stored in the license table. Furthermore, a terminal expiration date/time 1303 is stored in the table to indicate the time at which the temporary license is automatically returned when the terminal return flag is set at "automatic return". In addition, a terminal ID 1305 is also stored to identify the terminal to which the temporary license is to be issued. The terminal ID is included in the session initiation command. These pieces of information are stored in the issued temporary license information table 13, and each record is deleted when its corresponding temporary license has been returned from the terminal or automatic return has been carried out. With this arrangement, each record in the issued temporary license information table 13 can be analyzed by the license server 1 to determine to which terminal each temporary license has been issued.

Figure 7:
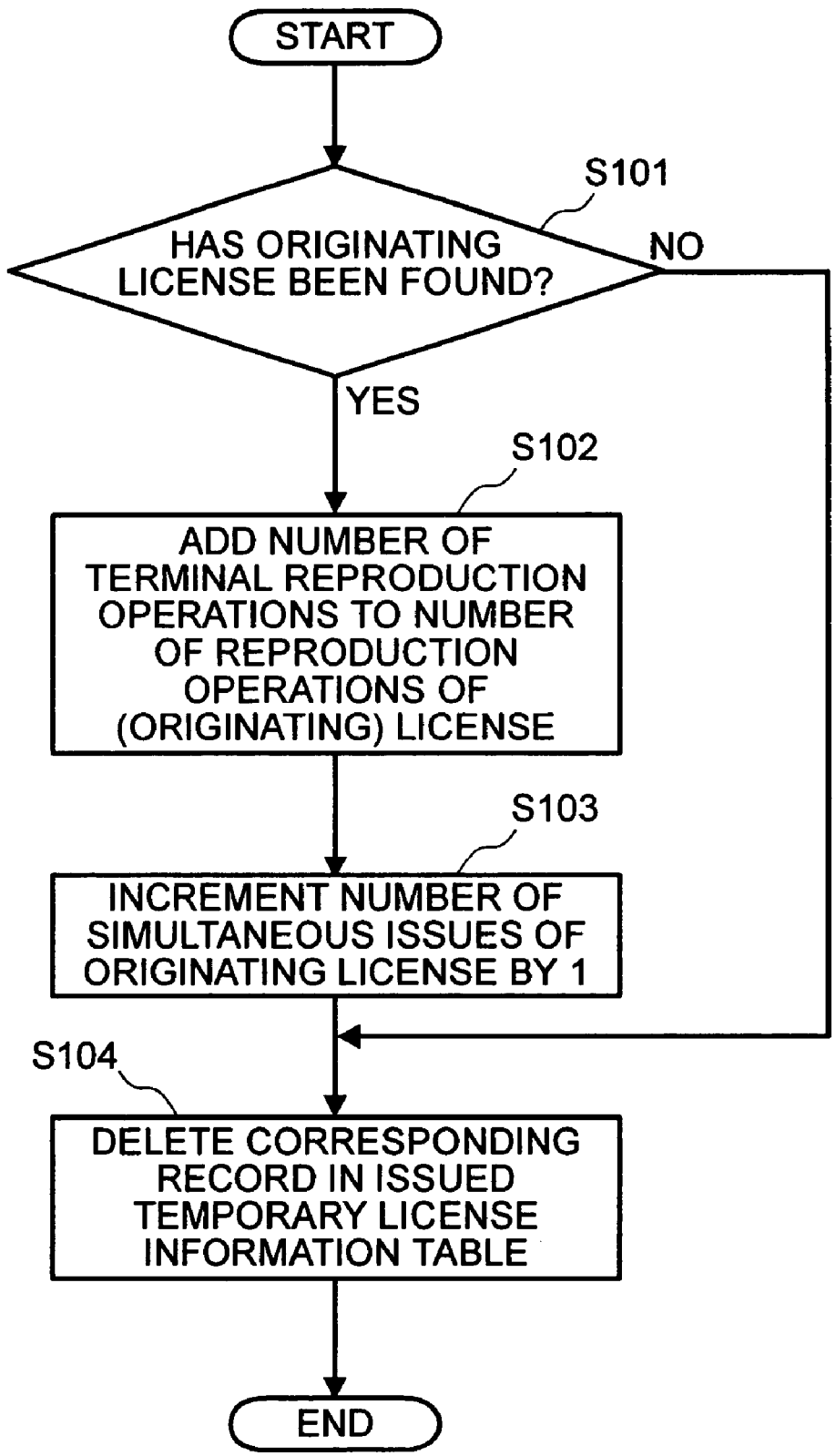
FIG. 7 is a flowchart showing an example of return processing of a temporary license according to the embodiment.

A description will below be made of an example of return of a temporary license with reference to FIGS. 6A to 6C and 7. Referring to FIGS. 6A to 6C, reference numeral 70 denotes a license stored in the license table of the license server before a temporary license is returned; 71 denotes the temporary license included in a temporary license return command; and 72 denotes a license stored in the license table of the license server after the temporary license is returned. Specifically, in the above example, the temporary license shown in FIGS. 2A to 2D was used to reproduce content twice at a terminal and returned to the license server. FIG. 7 is a flowchart showing an example of updating of a license when a temporary license has been returned.

First of all, the return control section 24 analyzes the temporary license 71 included in a temporary license return command transmitted from a terminal and searches the license table 11 for the record of the license whose license ID is LID 5, which is indicated by the temporary license 71, at step S101. If the record has been found, the return control section 24 continues the return processing. If, on the other hand, the record has not been found, the processing proceeds to step S104 without performing any return processing since no originating license has been found.

Step S102 performs return processing on the maximum allowable number of content reproduction operations 705. Specifically, the maximum allowable number of terminal content reproduction operations 715 of the returned temporary license 71 is added to the maximum allowable number of content reproduction operations 705 of the license 70 set before the temporary license is returned to obtain the maximum allowable number of content reproduction operations 725 of the license 72 set after the temporary license is returned, at step S102. Accordingly, in the example of FIG. 6, since the maximum allowable number of terminal content reproduction operations 715 is 1 and the maximum allowable number of content reproduction operations 705 is 2, the maximum allowable number of content reproduction operations 725 of the license 72 set after the temporary license is returned is set to 3. Thus, in the above processing, the values of the updated use conditions, or the values of the given use conditions minus the values of the actual use conditions, of the temporary license are added to the values of the use conditions of the originating license. With this arrangement, the user can return the remaining portion of what is permitted by the temporary license to the license server and use it afterward, instead of discarding it. The above example employs only one "consumptive type" terminal use condition, namely, the maximum allowable number of content reproduction operations. However, the maximum allowable reproduction time length, which is the length of time for which content can be reproduced at a terminal, may be set as another "consumptive type" terminal use condition. In such a case, the value of this use condition is also updated when the temporary license is returned.

Step S103 performs return processing on the maximum allowable number of simultaneous issues 706. Specifically, the maximum allowable number of simultaneous issues 706 of the license 70 set before the temporary license is returned is incremented by 1 to obtain the maximum allowable number of simultaneous issues 726 of the license 72 set after the temporary license is returned, at step S103. This arrangement increases the number of temporary licenses which can be issued, making it possible to obtain a temporary license at another terminal. In the example of FIGS. 6A to 6C, since the maximum allowable number of simultaneous issues 706 is 1, the maximum allowable number of simultaneous issues 726 of the license 72 set after the temporary license is returned is set to 2.

After the above license return processing, the issued temporary license information table 13 is searched for the record whose license ID and temporary license ID coincide with the license ID 711 and the temporary license ID 712 of the returned temporary license, respectively, and the found record is deleted at step S104.

Figure 8:
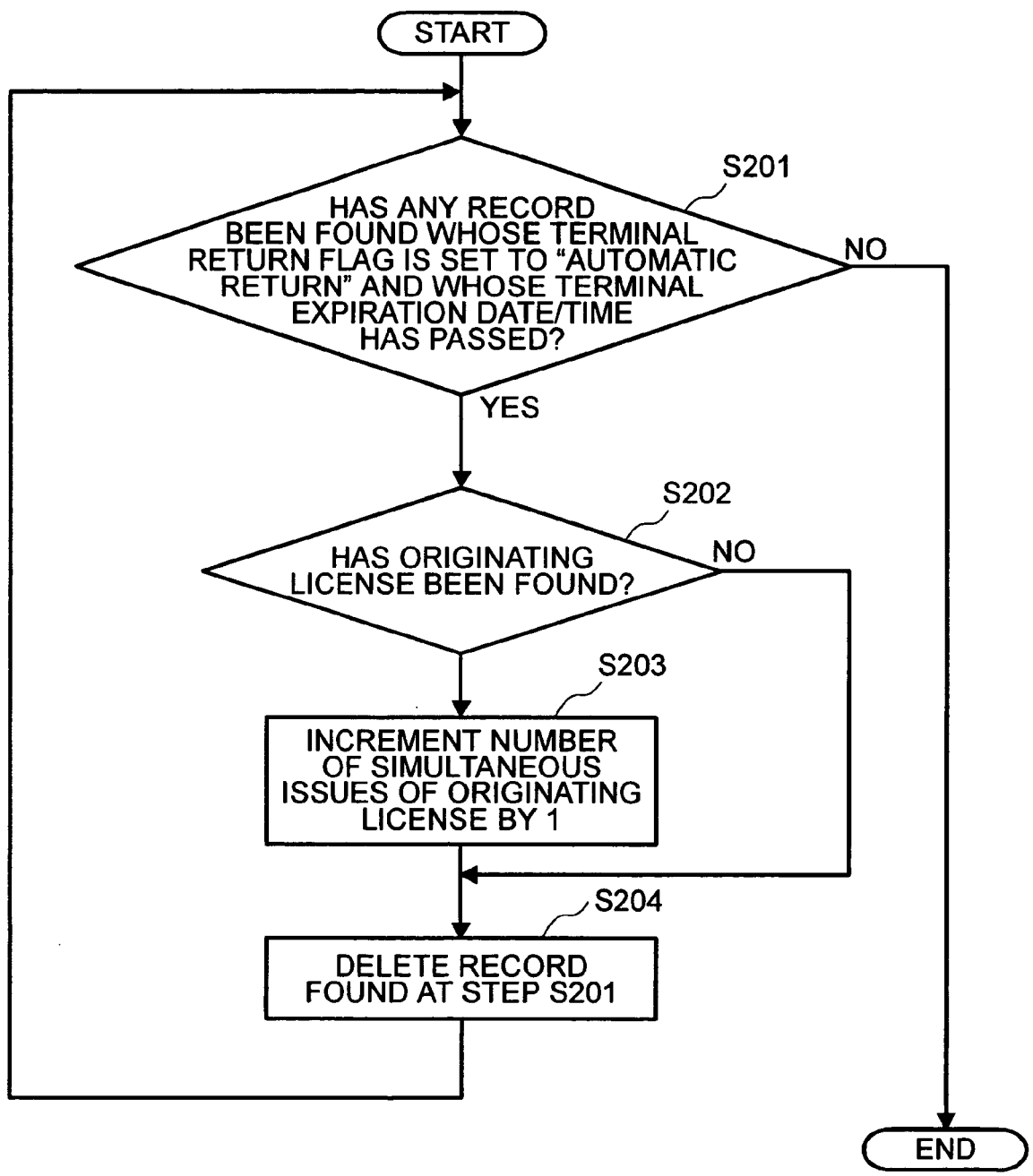
FIG. 8 is a flowchart showing an example of automatic return processing of a temporary license according to the embodiment.

A description will below be made of an example of automatic return of a temporary license with reference to FIG. 8. FIG. 8 is a flowchart showing an example of automatic return processing. The return control section 24 periodically performs the following steps to carry out automatic return. First of all, the return control section 24 searches the issued temporary license information table 13 for any record whose terminal return flag is set to "automatic return" and whose terminal expiration date/time has passed at step S201. If no such record has been found, the processing ends since there is no temporary license to be automatically returned. If such a record has been found, the return control section 24 searches the license table 11 for the originating license based on the license ID entry in the found record at step S202. If the originating license has not been found, since no return processing can be possibly carried out, the processing proceeds to step S204 at which the record found at step S201 is deleted before the processing returns to step S201.

If, on the other hand, the originating license has been found, the maximum allowable number of simultaneous issues of the license is incremented by 1 at step S203. In the case of automatic return processing, since the values of the actual "consumptive type" use conditions at the terminal are not known, the maximum allowable number of content reproduction operations is not updated, assuming that the values of all the given "consumptive type" use conditions have been reached. After that, the record in the issued temporary license information table 13 found at step S201 is deleted at S204. This completes automatic return processing on one temporary license. However, there may be other temporary licenses to be subjected to return processing in the issued temporary license information table 13. Therefore, the processing returns to step S201 to see if there exists any record whose terminal return flag is set to "automatic return" and whose terminal expiration date/time has passed, again. The above processing is repeated until no such record has been found.

This arrangement allows the server to carry out return processing on a temporary license even when the temporary license return command has not been transmitted from the terminal, enabling a user at another terminal to obtain a temporary license to reproduce content. Since the expiration date/time of the returned temporary license has already passed, the terminal holding the temporary license cannot use it to reproduce the content. Therefore, no problem arises when the content is reproduced at another terminal.

Figure 10:
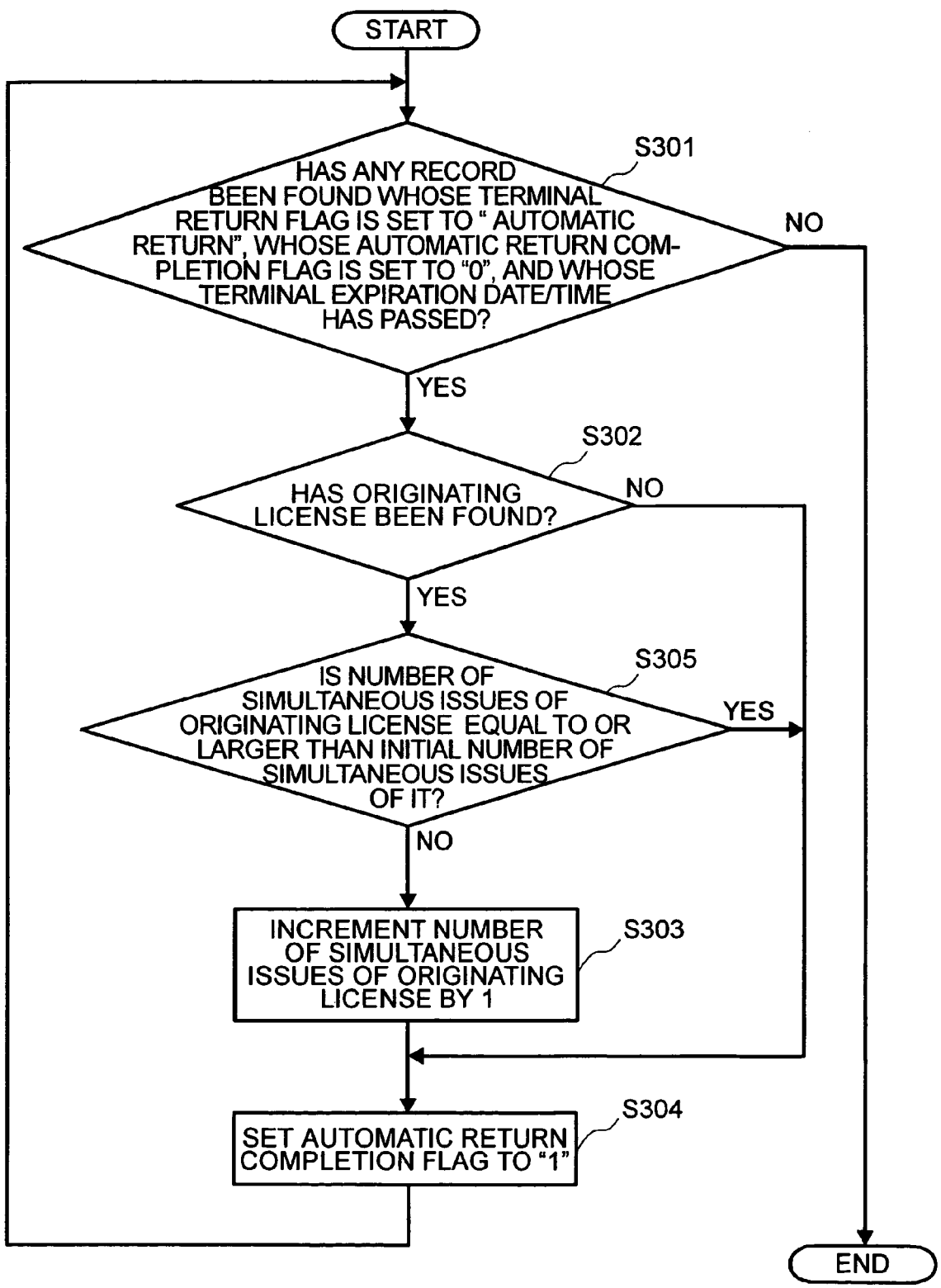
FIG. 10 is a flowchart showing another example of automatic return processing of a temporary license according to the embodiment.
Figure 11:
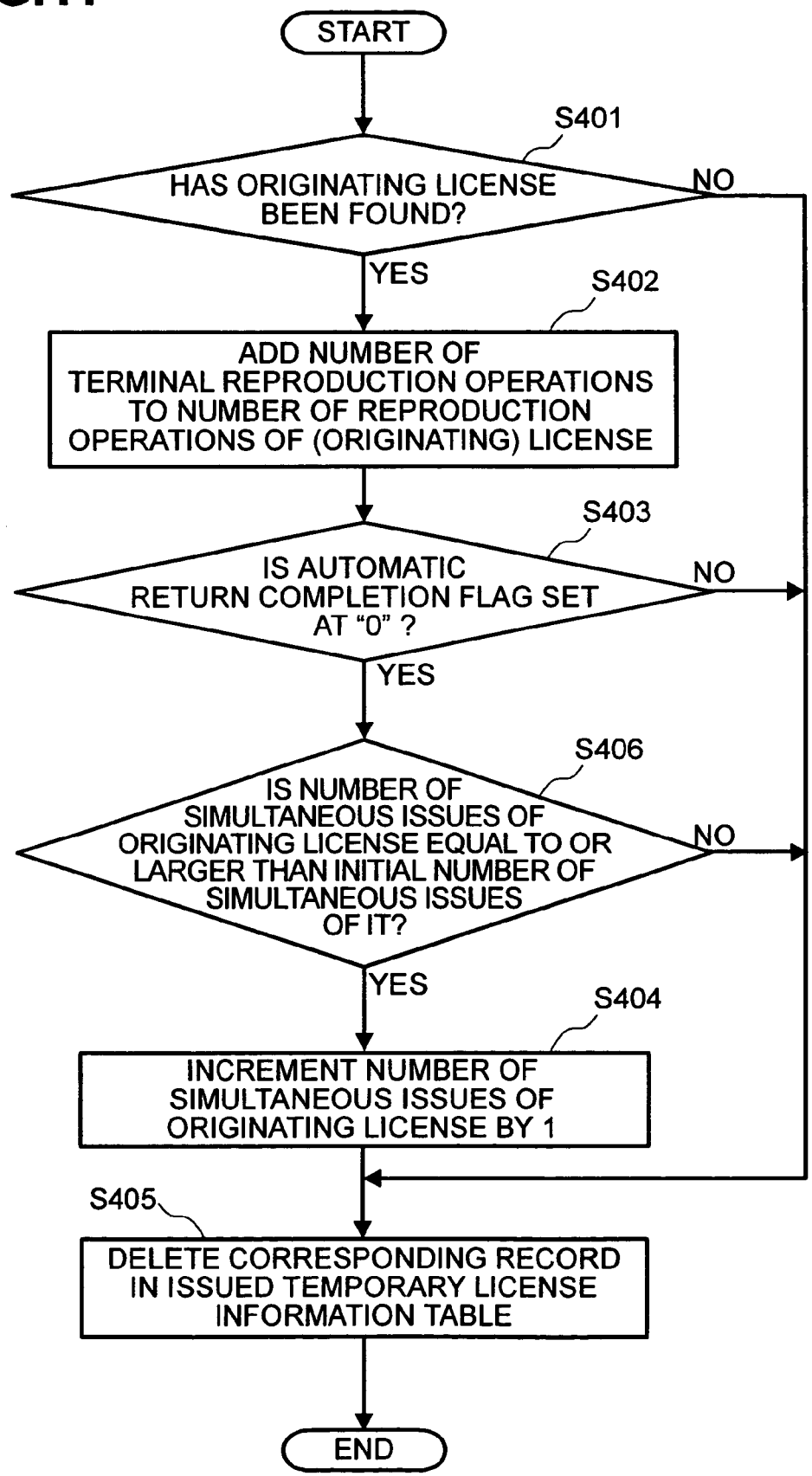
FIG. 11 is a flowchart showing another example of return processing of a temporary license according to the embodiment.

However, the above automatic return method cannot update the "consumptive type" use conditions of the originating license, such as the maximum allowable number of content reproduction operations, even when the values of the given "consumptive type" use conditions of the temporary license have not been reached. This means that the user has lost the remaining portion of what is permitted by the temporary license. A description will be made of another example of automatic return of a temporary license which solves the above problem with reference to FIGS. 9, 10, and 11. FIG. 9 is a diagram in which an automatic return completion flag is added to the issued temporary license information table shown in FIG. 5. FIG. 10 is a flowchart showing another example of automatic return processing. FIG. 11 is a flowchart showing another example of return processing.

The automatic return completion flag 1306 in FIG. 9 indicates whether automatic return processing has been performed. It is set to "0" to indicate that no automatic return processing has been performed, while it is set to "1" to indicate that automatic return processing has been already performed. The automatic return completion flag 1306 is initially set to "0" when the record is generated, that is, when the temporary license is issued.

First of all, the issued temporary license information table 13 is searched for any record whose terminal return flag 1304 is set to "automatic return", whose automatic return completion flag 1306 is set to "0", and whose terminal expiration date/time has passed at step S301. If no such record has been found, the processing ends since there is no temporary license to be automatically returned. If, on the other hand, such a record has been found, the license table 11 is searched for the originating license based on the license ID entry in the found record at step S302. If the originating license has not been found, since no return processing can be possibly carried out, the processing proceeds to step S304 at which the automatic return completion flag 1306 is set to "1" to indicate that the current processing has been completed. Then, the processing returns to step S301. If, on the other hand, the originating license has been found, it is determined whether the maximum allowable number of simultaneous issues of the originating license is equal to or larger than the initial maximum allowable number of simultaneous issues of the original license which was set when the temporary license was purchased, at step S305. If yes, since the maximum allowable number of simultaneous issues of the original license does not exceed the initial maximum allowable number of simultaneous issues of the original license, the processing proceeds to step S304 at which the automatic return completion flag 1306 is set to "1", to indicate that the current processing has been completed, and the processing returns to S301. If no, the processing proceeds to the next step. At step S303, the maximum allowable number of simultaneous issues of the originating license is incremented by 1. In the case of automatic return processing, since the values of the actual "consumptive type" use conditions at the terminal are not known, the maximum allowable number of content reproduction operations is not updated, assuming that the values of all the given "consumptive type" use conditions have been reached. After that, the automatic return completion flag 1306 is set to "1" at step S304. This completes automatic return processing on one temporary license. However, there may be other temporary licenses to be subjected to automatic return processing in the issued temporary license information table 13. Therefore, the processing returns to step S301 to see if there exists any other record whose terminal return flag 1304 is set to "automatic return", whose automatic return completion flag 1306 is set to "0", and whose terminal expiration date/time has passed. The above processing is repeated until no such record has been found. This processing is different from the processing shown in FIG. 8 in only two respects: the search conditions at step S301 include the condition that the target records must have their automatic return completion flag 1306 set to "0"; and step S304 sets the automatic return completion flag 1306 to "1" instead of deleting a record in the issued temporary license information table 13. The terminal return flag 1304 is used to indicate whether the server is to automatically return the temporary license, whether the temporary license is to be returned from the terminal to the server, and whether return of the temporary license is to be inhibited.

FIG. 11 shows return processing performed using a temporary license return command sent from a terminal. First of all, the return control section 24 analyzes the temporary license included in a temporary license return command transmitted from a terminal and searches the license table 11 for the record which includes the license ID of the originating license at step S401. If the record has been found, the return control section 24 continues the return processing. If, on the other hand, the record has not been found, the processing proceeds to step S405 without performing any processing since no originating license has been found. If the record of the originating license has been found, the maximum allowable number of terminal content reproduction operations of the returned temporary license is added to the maximum allowable number of content reproduction operations of the originating license set before the temporary license is returned, at step S402.

After that, the automatic return completion flag in the temporary license record in the issued temporary license information table whose license ID and temporary license ID coincide with those of the returned temporary license is checked at step S403. If the automatic return completion flag is set at "1", the processing proceeds to step S405 without updating the maximum allowable number of simultaneous issues of the originating license since the temporary license has already been automatically returned.

If, on the other hand, the automatic return completion flag is set at "0", since no automatic return processing has been carried out, it is determined whether the maximum allowable number of simultaneous issues of the originating license is equal to or larger than the initial maximum allowable number of simultaneous issues of the originating license which was set when the temporary license was purchased, at step 406. If yes, since the maximum allowable number of simultaneous issues of the originating license does not exceed the initial maximum allowable number of simultaneous issues of the originating license, the processing proceeds to step S405 without performing any return processing. If no, the processing proceeds to the next step. At step S404, the maximum allowable number of simultaneous issues of the originating license is incremented by 1. Then, the present temporary license record in the issued temporary license information table is deleted at step S405, and the processing ends.

Thus, when the terminal expiration date/time of a temporary license has passed, the maximum allowable number of simultaneous issues of the originating license is incremented by 1 through automatic return, enabling the user at another terminal to obtain a temporary license to reproduce content. Further, the automatic return completion flag of a temporary license is set to "1" after the automatic return processing has been carried out, preventing further automatic return of the temporary license. Still further, even a temporary license which has been already automatically returned can be returned again by use of a temporary license return command in order to update the consumptive type" use conditions of the originating license, such as the maximum allowable number of content reproduction operations, and thereby prevent the user from losing the remaining portion of what is permitted by the temporary license, enhancing the usability for users.

Figure 12A:
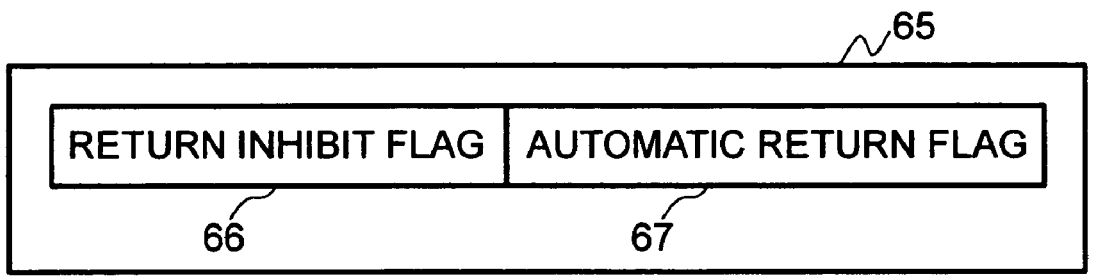
FIGS. 12A and 12B are diagrams illustrating a terminal return flag and a requested terminal return flag for terminals, respectively, according to the embodiment.
Figure 12B:
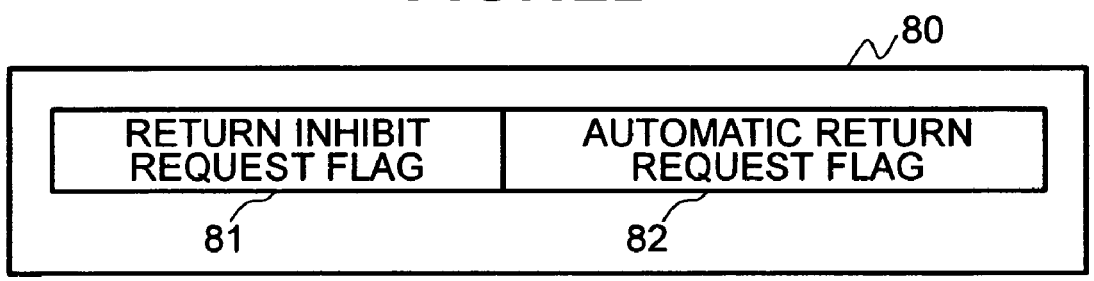
Figure 13:
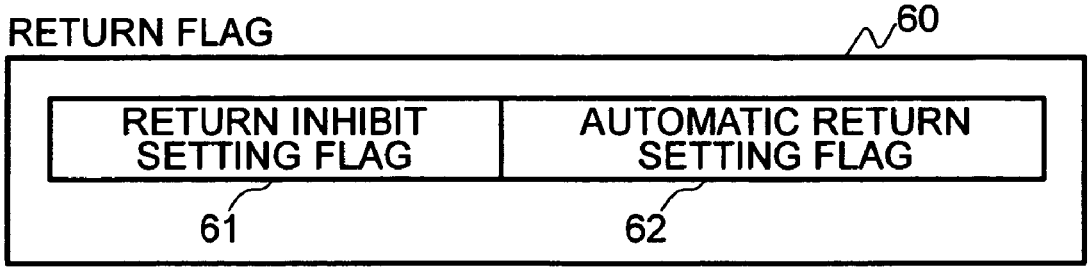
FIG. 13 is a diagram illustrating a return flag of a license for terminals according to the embodiment.

A description will below be made of another terminal return flag and another return flag with reference to FIGS. 12A, 12B and 13. Referring to FIGS. 12A and 12B, reference numeral 65 denotes a terminal return flag included in a temporary license; 66 a return inhibit flag which is a component of the terminal return flag 65; 67 an automatic return flag which is another component of the terminal return flag 65; 80 a terminal return request flag included in a temporary license acquisition request information; 81 a return inhibit request flag which is a component of the terminal return request flag 80; and 82 an automatic return request flag which is another component of the terminal return request flag 80. Referring to FIG. 13, reference numeral 60 denotes a return flag included in a license; 61 a return inhibit setting flag which is a component of the return flag 60; and 62 an automatic return setting flag which is another component of the return flag 60.

The return inhibit flag 66 is set to 1 to indicate that the terminal is not to return the temporary license, while it is set to 0 to indicate that the terminal is to return the obtained temporary license. The automatic return flag 67 is set to 1 to indicate that the license server is to return the temporary license automatically, while it is set to 0 to indicate that no automatic return is to be carried out.

Further, the return inhibit setting flag 61 is set to "return inhibited" to indicate that the return inhibit flag 66 of the temporary license to be issued is to be set to 1, while it is set to "return required" to indicate that the return inhibit flag 66 is to be set to 0. Furthermore, the return inhibit setting flag 61 is set to "both acceptable" to indicate that the return inhibit flag 66 is to be set to the value of the return inhibit request flag 81 included in the temporary license acquisition request information. The automatic return setting flag 62 is set to "automatic return permitted" to indicate that the automatic return flag 67 of the temporary license to be issued is to be set to 1, while it is set to "automatic return not permitted" to indicate that the automatic return flag 67 is to be set to 0. Furthermore, the automatic return setting flag 62 is set to "both acceptable" to indicate that the automatic return flag 67 is to be set to the value of the automatic return request flag 82 included in the temporary license acquisition request information.

Figures 14A, 14B:
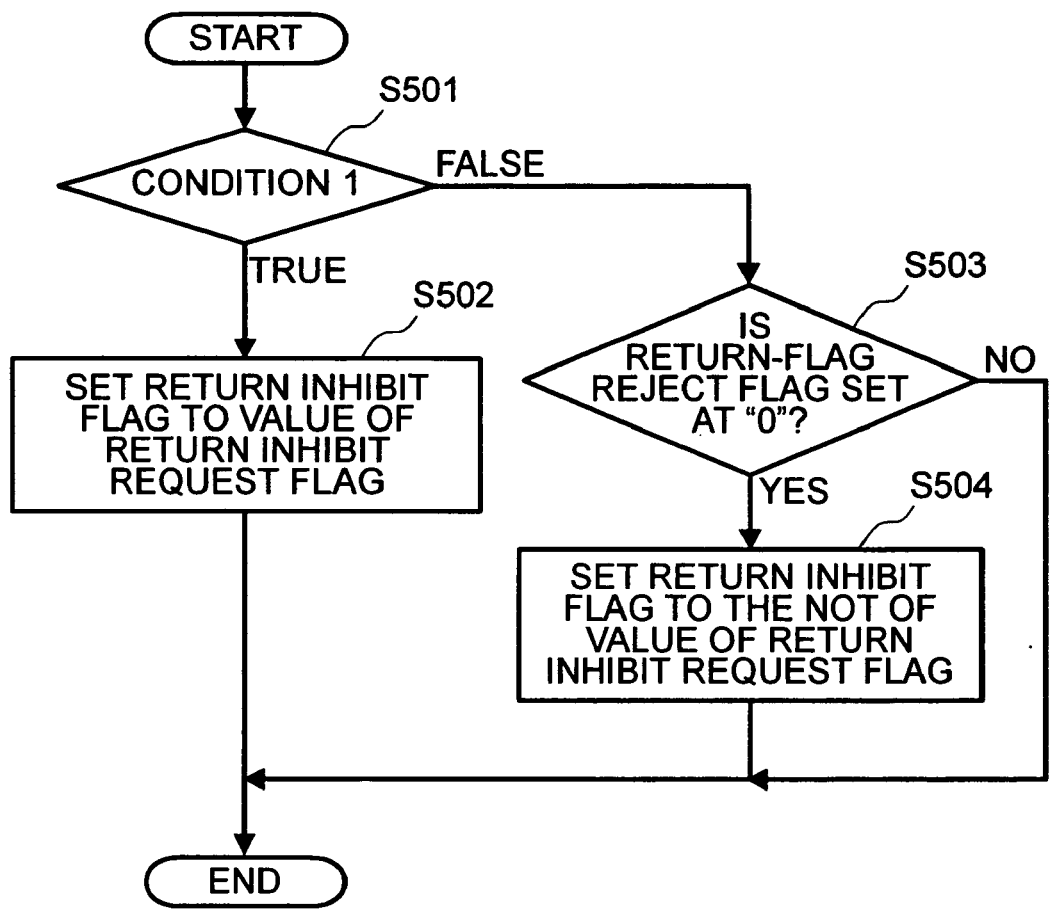
FIGS. 14A and 14B illustrate an example of setting processing of a return inhibit flag according to the embodiment.
Figures 15A, 15B:
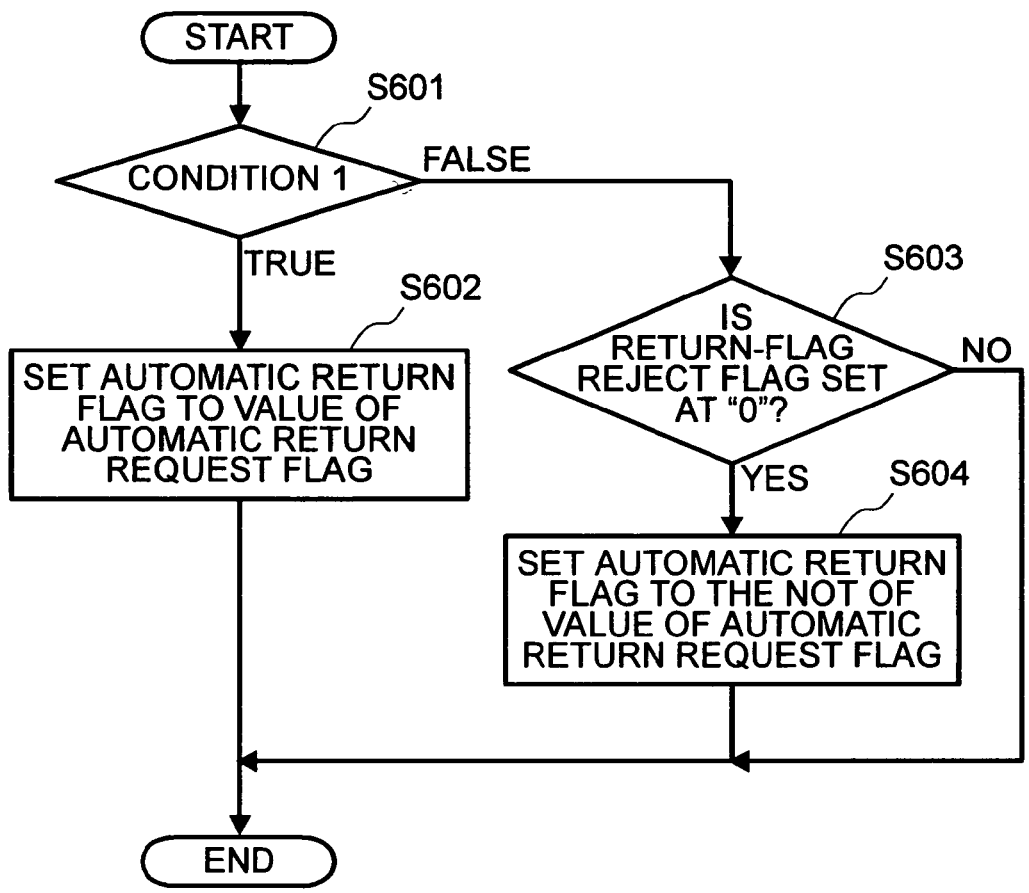
FIGS. 15A and 15B illustrate an example of setting processing of an automatic return flag according to the embodiment.

A description will below be made of setting of a return flag with reference to FIGS. 14A, 14B, 15A and 15B. FIGS. 14A and 14B are flowcharts showing setting of a return inhibit flag, while FIGS. 15A and 15B are flowcharts showing setting of an automatic return flag.

A description will below be made of setting of a return inhibit flag with reference to FIGS. 14A and 14B. First of all, at step S501, it is determined whether one of the following three conditions is met: the return inhibit setting flag is set at "both acceptable"; the return inhibit request flag is set at 0 and the return inhibit setting flag is set at "return required"; and the return inhibit request flag is set at 1 and the return inhibit setting flag is set at "return inhibited". If one of the conditions is met, the return inhibit flag is set to the value of the return inhibit request flag at step S502, and the processing ends. If, on the other hand, none of the conditions is met, it is determined whether the return-flag reject flag included in the temporary license acquisition request information is set at 0 at step S503. If the return-flag reject flag is set at 0, the temporary license can be issued even though the return inhibit flag cannot be set to the value of the return inhibit request flag. Therefore, the return inhibit flag is set to the NOT of the value of the return inhibit request flag at step S504, and the processing ends. If, on the other hand, the return-flag reject flag is set at 1, the temporary license cannot be issued when the return inhibit flag cannot be set to the value of the return inhibit request flag. Therefore, the processing ends without setting any value to the return inhibit flag.

A description will be made of setting of an automatic return flag with reference to FIGS. 15A and 15B. First of all, at step S601, it is determined whether one of the following three conditions is met: the automatic return setting flag is set at "both acceptable"; the automatic return request flag is set at 0 and the automatic return setting flag is set at "automatic return not permitted"; and the automatic return request flag is set at 1 and the automatic return setting flag is set at "automatic return permitted". If one of the conditions is met, the automatic return flag is set to the value of the automatic return request flag at step S602, and the processing ends. If, on the other hand, none of the conditions is met, it is determined whether the return-flag reject flag included in the temporary license acquisition request information is set at 0 at step S603. If the return-flag reject flag is set at 0, the temporary license can be issued even though the automatic return flag cannot be set to the value of the automatic return request flag. Therefore, the automatic return flag is set to the NOT of the value of the automatic return request flag at step S604, and the processing ends. If, on the other hand, the return-flag reject flag is set at 1, the temporary license cannot be issued when the automatic return flag cannot be set to the value of the automatic return request flag. Therefore, the processing ends without setting any value to the automatic return flag.

Thus, the license server can set the return flag included in the temporary license to different values as requested by the terminal, making it possible to make various settings for return of a temporary license.

A description will below be made of generation of temporary license acquisition request information with reference to FIG. 19. Referring to FIG. 19, reference numeral 90 denotes an expiration date/time request indication box; 94 an expiration date/time forward button; 95 an expiration date/time back button; 91 a number-of-reproduction-operations request indication box; 96 a number-of-reproduction-operations increase button; 97 a number-of-reproduction-operations decrease button; 92 an automatic return request indication box; 98 an automatic return request check box; 93 a return inhibit request indication box; 99 a return inhibit request check box; and 100 an OK button.

To request a temporary license, temporary license acquisition request information is generated as follows: The user selects a license ID identifying a license and a content ID and enters information on the temporary license to be requested on the temporary license request information input screen as shown in FIG. 19. The terminal expiration date/time to be requested is set by pressing the expiration date/time forward button 94 or the expiration date/time back button 95 through an input device such as a remote controller or a mouse. Likewise, the maximum allowable number of content reproduction operations to be requested is set by pressing the number-of-reproduction-operations increase button 96 or the number-of-reproduction-operations decrease button 97 through an input device such as a remote controller or a mouse. In the case of a portable terminal such as a PDA, the automatic return request check box 98 may be selected through an input device such as a remote controller or a mouse to request automatic return. If the user needs to inhibit the return, the user selects the return inhibit request check box 99 through an input device such as a remote controller or a mouse. The user then checks the values in the expiration date/time request indication box 90, the number-of-reproduction-operations request indication box 91, the automatic return request indication box 92, the automatic return request check box 98, the return inhibit request indication box 93, and the return inhibit request check box 99 on the screen, and if there is no problem, the user presses the OK button 100 through an input device to accept the input temporary license acquisition request information. In this example, the user enters a value for each request item. However, some request items may have their values predetermined and fixed, eliminating the need for user input; for example, the maximum allowable number of content reproduction operations to be requested may be always set to 1. The example of FIG. 19 is arranged such that the user does not enter any values for the expiration-date/time reject flag, the number-of-reproduction-operations reject flag, and the return-flag reject flag. These flags are all preset to 0, instead, and a temporary license is requested whose expiration date/time is set such that it does not exceed the expiration date/time of the originating license. However, it goes without saying that the user may enter these values. These settings may be established for each terminal beforehand. For example, in the case of portable terminals such as PDAs, the automatic return request flag may be always set such that these terminals request automatic return since they are not always connected to the communication network. Further, for fixed terminals such as STBs, the flag may be always set such that they do not request any automatic return.

A description will below be made of automatic backup. FIG. 16 is a diagram showing an issued temporary license information table configured for automatic backup. In FIG. 16, reference numeral 1307 denotes an issued temporary license field. The issued temporary license information table of FIG. 16 is different from that of FIG. 9 in that it does not have such fields as license ID, temporary license ID, expiration date/time, and terminal return flag, but has the issued temporary license field 1307 instead. Since each temporary license includes all of the above information such as the license ID, the temporary license ID, the terminal expiration date/time, and the terminal return flag, it is needed only to store the issued temporary license 1307. As described above, each record in the issued temporary license information table is stored there when its temporary license is issued, and deleted when the temporary license has been returned from the terminal or automatically returned. Therefore, these records may be used as backups of the temporary licenses. That is, when data of a temporary license at a terminal has been damaged, the backup data may be used to restore the temporary license. Since each terminal is operated by users, the temporary license data might be damaged due to unexpected power failure, unplugging, etc., leading to a complaint. In such a case, the provider may use the above restore method as an effective way of solving the problem.

Figure 17:
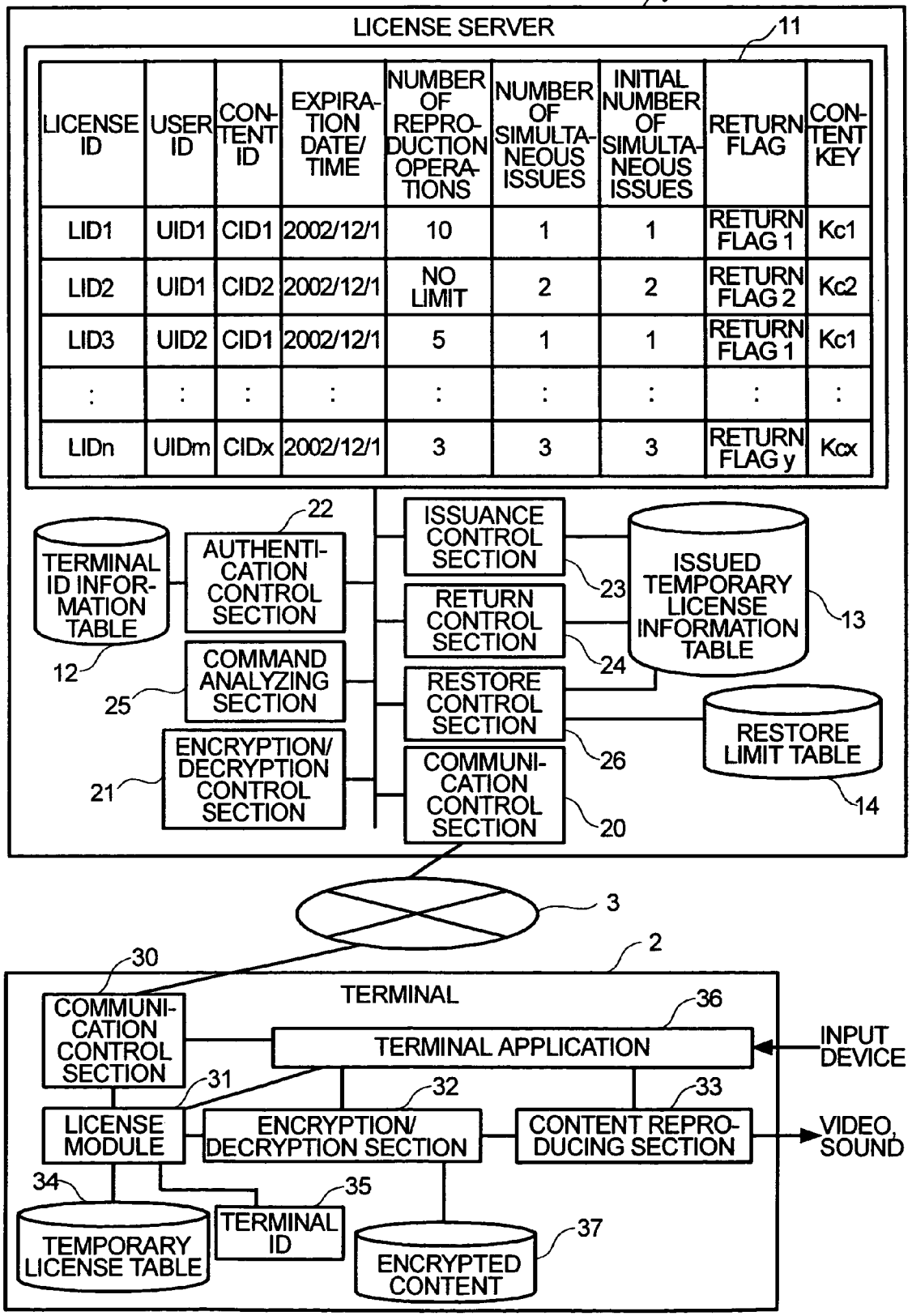
FIG. 17 is a diagram showing another configuration of the license distribution system according to the embodiment.

The restore processing steps are described below with reference to FIG. 17. Referring to FIG. 17, reference numeral 26 denotes a restore control section, and 14 denotes a restore limit table for storing the terminal ID of each terminal and the remaining number of restore operations which can be performed at the terminal in order to limit the number of restore operations performed at each terminal.

When the terminal 2 has detected damage to data of a temporary license stored in the temporary license table 34, the terminal can request the license server 1 to execute restore operation. Whether to make such a request may be determined by the user. The following procedure is used to request a restore operation. First of all, a session initiation command is used to establish a secure session. After authentication of the terminal using its terminal ID, the license module 13 in the terminal 2 transmits a restore request command through the communication control section 30. The command analyzing section in the license server 1 analyzes the restore request command and sends it to the restore control section 26. In response, the restore control section 26 searches the issued temporary license information table 13 for the records of the issued temporary licenses to be restored based on the terminal ID included in the transmitted session initiation command. All temporary licenses whose terminal ID coincides with the transmitted terminal ID are grouped together. From the restore limit table, the restore control section 26 reads out the remaining number of restore operations set for the terminal ID to see if it is larger than 0. If it is equal to 0, it is determined that no further restore operation can be executed, and therefore the restore control section 26 transmits a response to the restore request command which indicates that no further restore operation can be executed due to a restore limit. If the remaining number of restore operations is larger than 0, it is decremented by 1, and the restore control section 26 transmits data of the above grouped temporary licenses, whose terminal ID coincides with the transmitted terminal ID, to the terminal 2 as a response. Thus, use of a restore limit makes it possible to prevent execution of an unlimited number of restore operations. For example, when the provider has received a complaint from a user, the provider may set the remaining number of restore operations for the terminal to 1 in the restore limit table so that the user can perform restore operation.

Figure 18:
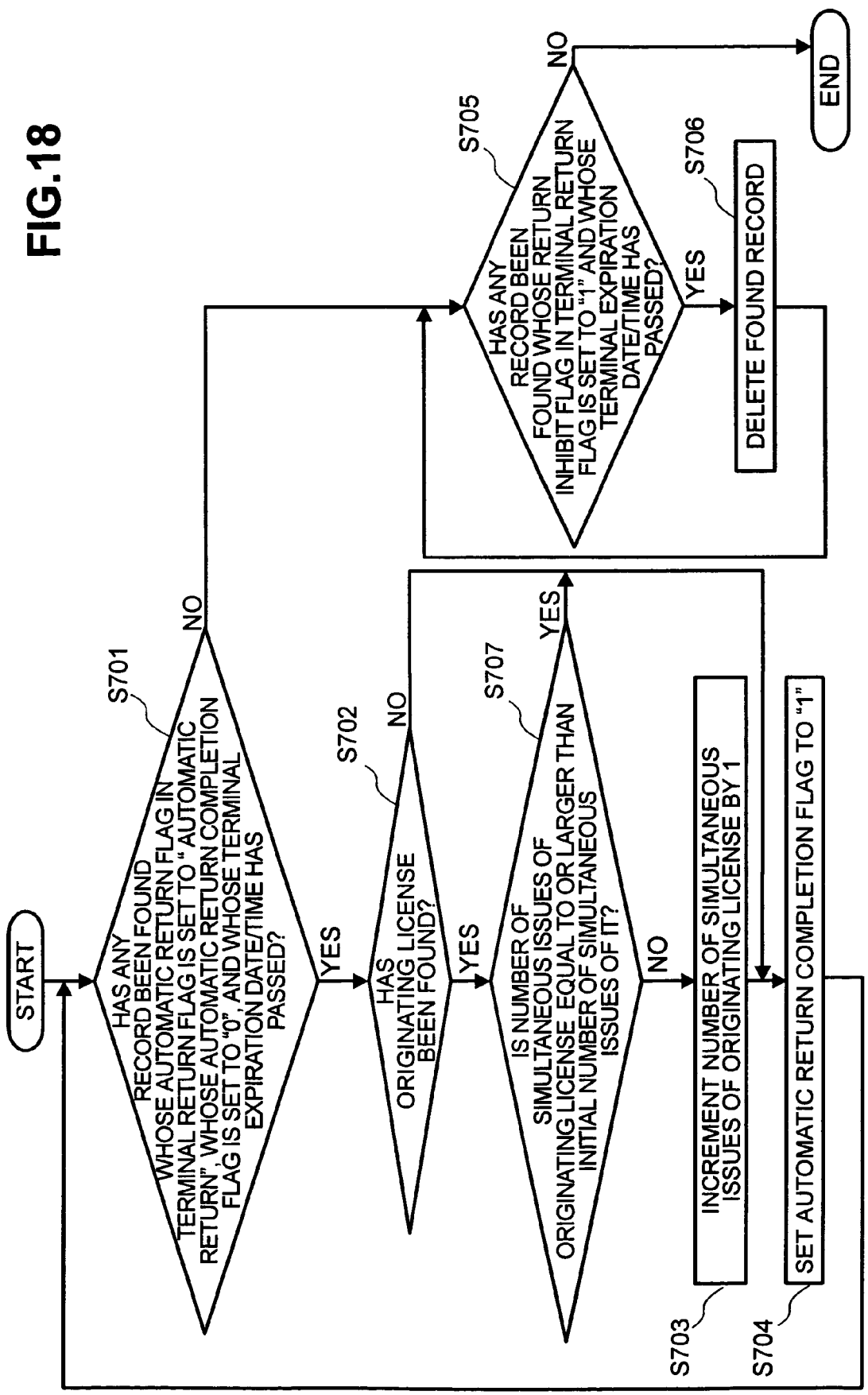
FIG. 18 is a flowchart showing still another example of automatic return processing of a temporary license according the embodiment.

A description will below be made of still another example of automatic return of a temporary license with reference to FIG. 18. FIG. 18 is a flowchart illustrating automatic return of a temporary license using a return inhibit flag.

First of all, the issued temporary license information table 13 is searched for any record whose automatic return flag in its terminal return flag in its issued temporary license 1307 is set at "automatic return", whose automatic return completion flag 1306 is set at 0, and whose terminal expiration date/time in its issued temporary license 1307 has passed at step S701. If no such record has been found, the processing proceeds to step S705 since there is no temporary license to be automatically returned. If, on the other hand, such a record has been found, the license table 11 is searched for the originating license based on the license ID entry in the issued temporary license in the found record at step S702. If the originating license has not been found, since no return processing can be possibly carried out, the processing proceeds to step S704 at which the automatic return completion flag 1306 is set to 1 to indicate that the current processing has been completed. Then, the processing returns to step S701. If, on the other hand, the originating license has been found, it is determined whether the maximum allowable number of simultaneous issues of the originating license is equal to or larger than the initial maximum allowable number of simultaneous issues of the originating license which was set when the temporary license was purchased, at step S707. If yes, since the maximum allowable number of simultaneous issues of the originating license does not exceed the initial maximum allowable number of simultaneous issues of the originating license, the processing proceeds to step S704 without performing any return processing. At step S704, the automatic return completion flag 1306 is set to 1 to indicate that the current processing has been completed, and the processing returns to step S701. If no, the processing proceeds to the next step. At step S703, the maximum allowable number of simultaneous issues of the originating license is incremented by 1. In the case of automatic return processing, since the values of the actual "consumptive" type use conditions at the terminal are not known, the maximum allowable number of content reproduction operations is not updated, assuming that the values of all the given "consumptive type" use conditions have been reached. After that, the automatic return completion flag 1306 is set to 1 at step S704. This completes automatic return processing on one temporary license. However, there may be other temporary licenses to be subjected to automatic return processing in the issued temporary license information table 13. Therefore, the processing returns to step S701 to see if there exists any other record whose automatic return flag is set at "automatic return", whose automatic return completion flag 1306 is set at 0, and whose terminal expiration date/time has passed. The above processing is repeated until no such record has been found at step S701. After the entire automatic return processing has been completed, the processing proceeds to step S705. At step S705, a search is made for any record whose return inhibit flag in its return flag within its issued temporary license is set at 1 and whose expiration date/time has passed. If no such record has been found, the entire processing ends. If, on the other hand, such a record has been found, the found record is deleted at step S706, and the processing returns to step S705. This processing prevent the number of temporary licenses whose return inhibit flag is set at 1 from gradually increasing since they are not returned and therefore not deleted from the issued temporary license information table 13. That is, it is possible to delete temporary licenses whose return is inhibited and which can no longer be used since their expiration date/time has passed.

As described above, the present invention provides a license management system which enables a plurality terminals to share licenses managed by a license server connected to them through a communications network.

Further, the present invention also can provide a license management system which enables a license server to perform automatic return processing on a temporary license which has been transmitted to a terminal and whose expiration date/time has passed, allowing the user to use copyrighted content more conveniently.

Still further, according to the present invention, a temporary license can be backed up when it is issued, making it possible to restore the temporary license when its data has been damaged at the terminal. With this arrangement, user complaints can be handled more easily.

Still further, according to the present invention, the number of restore operations which can be executed on content can be restricted, making it possible to protect copyrighted content.

What is claimed is:

1. A license management system comprising:
 a license server connected to a network; and
 a terminal connected to the network;
 wherein said license server includes:
 a first memory unit for storing a first license which includes both a content key for decrypting content and a first use condition, wherein said first use condition includes an expiration date/time for content;
 an issuance unit for, according to a request from said terminal, issuing a second license which includes a second use condition set such that a value of said second use condition is within a value of said first use condition of said content, wherein said second use condition includes an expiration date/time for said terminal which is within said expiration date/time for content; and
 a transmission unit for transmitting to said terminal said second license that is issued; and
 wherein said terminal includes:
 a license control unit for managing said second license transmitted from said server; and
 a reproduction unit for reproducing said content by use of said content key; and
 wherein said license server further includes:
 a second memory unit for storing information on said second license which includes said expiration date/time for said terminal which is included in said second use condition and a return mode flag which indicates one of (a) an automatic return and (b) return required, wherein: automatic return indicates that a return state of said second license is automatically restored without a return of said second license, and return required indicates that a return of said second license from said terminal is required to restore said return state of said second license; and
 a return control section for determining whether or not said return mode flag indicates said automatic return and said expiration date/time for said terminal has passed, and for automatically restoring to said return state of said second license when said return mode flag indicates said automatic return and said expiration date/time for said terminal has passed, even if no second license is returned from the terminal to the server, so that said issuance unit can issue said second license for another terminal; wherein:
 said issuance unit in said server determines whether or not a return mode flag included in said request from said terminal matches said return mode flag in said second memory unit, sets said return mode flag included in said request from said terminal into said second license if matching, and sets a return mode flag of said first license into said second license when a return reject flag included in said request from said terminal is a predetermined value if not matching,
 said return control section in said server sets said return mode flag into said second license depending on said request from said terminal and restores a number of simultaneous issues of said first license when said return control section automatically restores to said return state of said second license, and
 said return control section in said server deletes said information on said second license in said second memory unit without restoring said number of simultaneous issues of said first license when said second license which is returned from said terminal after said expiration date/time for said terminal has already been automatically returned by said server.

2. A server for issuing a content key for decrypting content, comprising:

a first memory unit for storing a first license which includes said content key and a first use condition, wherein said first use condition includes an expiration date/time for said content;

an issuance unit for, when a value of a use condition of said content requested by a terminal does not exceed a value of said first use condition stored in said memory unit, issuing a second license which includes said content key and a second use condition, wherein said second use condition includes an expiration date/time for said terminal which is within said expiration date/time for content;

a communication unit for transmitting said second license to said terminal;

a second memory unit for storing information on said second license which includes said expiration date/time for said terminal which is included in said second use condition and a return mode flag which indicates one of (a) an automatic return and (b) return required, wherein: automatic return indicates that a return state of said second license is automatically restored without a return of said second license, and return required indicates that a return of said second license from said terminal is required to restore said return state of said second license; and a return control section for determining whether or not said return mode flag indicates said automatic return and said expiration date/time for said terminal has passed, and for automatically restoring to said return state of said second license when said return mode flag indicates said automatic return and said expiration date/time for said terminal has passed, even if no second license is returned from the terminal to the server, so that said issuance unit can issue said second license for another terminal; wherein:

said issuance unit in said server determines whether or not a return mode flag included in said request from said terminal matches said return mode flag in said second memory unit, sets said return mode flag included in said request from said terminal into said second license if matching, and sets a return mode flag of said first license into said second license when a return reject flag included in said request from said terminal is a predetermined value if not matching, said return control section sets said return mode flag into said second license depending on said request from said terminal and restores a number of simultaneous issues of said first license when said return control section automatically restores to said return state of said second license, and said return control section in said server deletes said information on said second license in said second memory unit without restoring said number of simultaneous issues of said first license when said second license which is returned from said terminal after said expiration date/time for said terminal has already been automatically returned by said server.

3. The server as claimed in claim 2, wherein:
said first use condition includes a maximum allowable number of simultaneous issues indicating a number of issues of said second license which can be distributed at the same time; and
said return control section stops automatically restoring said return state of said second license when the maximum allowable number of simultaneous issues has exceeded an initial value stored in said first memory unit.

4. The server as claimed in claim 2, wherein:
said license information includes return mode information indicating whether or not said second license is to be returned, said return mode information being provided for each second license; and
said return control section executes or stops return processing on said second license according to said return mode information.

5. The server as claimed in claim 4, wherein said return control section is configured for setting said return mode information according to a request from said terminal.

6. The server as claimed in claim 4, wherein said return mode information includes information for determining whether said server is to automatically return said second license.

7. The server as claimed in claim 4, wherein said return mode information includes information for determining whether said terminal is to return said second license to said server.

8. The server as claimed in claim 2, wherein:
said first use condition is determined by a manager of said content or a manager of said first license; and
said second use condition is determined by a user of said content.

9. The server as claimed in claim 2, wherein:
said first use condition includes a maximum allowable number of simultaneous issues indicating a number of issues of said second license which can be distributed at the same time;
when said issuance unit has issued said second license, said issuance unit decrements the maximum allowable number of simultaneous issues; and
said return control section increments the maximum allowable number of simultaneous issues to automatically restore to said return state of said second license when said expiration date/time for said terminal has passed.

10. The server as claimed in claim 2, wherein:
when said issuance unit has issued said second license, said issuance unit inhibits further issuance of said second license; and
when said expiration date/time for said terminal has passed, said return control section cancels said inhibition of further issuance of said second license to automatically restore to said return state of said second license.

11. The server as claimed in claim 2, wherein:
said first use condition includes a first value of the number of reproduction operations of said content;
said second use condition includes a second value of the number of reproduction operations of said content;
when said issuance unit has issued said second license, said issuance unit subtracts said second value of the number of reproduction operations from said first value of the number of reproduction operations;
upon receiving said second license returned from said terminal, said return control section adds an update of said second value of the number of reproduction operations included in said second use condition to said first value of the number of reproduction operations; and when an expiration date/time for said terminal has passed, said return control section maintains said first value of the number of reproduction operations from which said second value of the number of reproduction operations has been subtracted, to automatically restore to said return state of said second license.

12. The server as claimed in claim 2, wherein:

when said issuance unit has issued said second license in said first memory, said issuance unit changes said first use condition; and when said expiration date/time for said terminal has passed, said return control section restores said second license in said first memory to automatically restore to said return state of said second license.

13. The server as claimed in claim 2, wherein said issuance unit sets a value of a return inhibit flag included in said request from said terminal into said second license if a return inhibit flag of said first license and a return inhibit flag included in said request from said terminal satisfies a predetermined condition and sets a value different from said value of a return inhibit flag included in said request from said terminal into said second license if said return inhibit flag of said first license and said return inhibit flag included in said request from said terminal does not satisfy said predetermined condition and a return reject flag included in said request from said terminal is predetermined value, and wherein said return inhibit flag of said first license indicates return required or return inhibited.

14. The server as claimed in claim 2, wherein said issuance unit sets a value of an automatic return flag included in said request from said terminal into said second license if an automatic return flag of said first license and an automatic return flag included in said request from said terminal satisfies a predetermined condition and sets a value different from said value of an automatic return flag included in said request from said terminal into said second license if said automatic return flag of said first license and said automatic return flag included in said request from said terminal does not satisfy said predetermined condition and a return reject flag included in said request from said terminal is a predetermined value, and wherein said automatic return flag of said first license indicates automatic return not permitted or automatic return permitted.

15. The server as claimed in claim 2, wherein said return control section retrieves said second license corresponding to said terminal from information on said second license in said second memory unit when said server receives a restore request from said terminal based on detection of damage to data of said second license in said terminal, and transmits said second license corresponding to said terminal to said terminal.

16. The server as claimed in claim 15, further comprising:

a table which stores number of restore for each terminal, wherein said return control section is configured to transmit said second license corresponding to said terminal if said number of restore corresponding to said terminal remains by referring the table, and to transmit a response which indicates the restore is impossible if said number of restore corresponding to said terminal does not remain by referring the table.

17. A terminal capable of communicating with a server for issuing a content key for decrypting content, said server comprising:

a first memory unit for storing a first license which includes said content key and a first use condition, wherein said first use condition includes an expiration date/time for said content;

an issuance unit for, when a value of a second use condition of said content requested by said terminal does not exceed a value of said first use condition stored in said first memory unit, issuing a second license which includes said content key and said second use condition, wherein said second use condition includes an expiration date/time for said terminal which is within said expiration date/time for content; and a communication unit for transmitting said second license to said terminal;

said terminal comprising:

a second memory unit for storing said content;

a communication unit for receiving said second license from said server;

a decryption unit for decrypting said content in said second memory unit by use of said content key included in said second license;

a reproduction unit for reproducing the decrypted content according to said second use condition included in said second license; and wherein said server further includes:

a second memory unit for storing information on said second license which includes said expiration date/time for said terminal which is included in said second use condition and a return mode flag which indicates one of (a) an automatic return and (b) return required, wherein: automatic return indicates that a return state of said second license is automatically restored without a return of said second license, and return required indicates that a return of said second license from said terminal is required to restore said return state of said second license; and a return control section for determining whether or not said return mode flag indicates said automatic return and said expiration date/time for said terminal has passed, and for automatically restoring to said return state of said second license when said return mode flag indicates said automatic return and said expiration date/time for said terminal has passed, even if no second license is returned from the terminal to the server, so that said issuance unit can issue said second license for another terminal; wherein:

said issuance unit in said server determines whether or not a return mode flag included in said request from said terminal matches said return mode flag in said second memory unit, sets said return mode flag included in said request from said terminal into said second license if matching, and sets a return mode flag of said first license into said second license when a return reject flag included in said request from said terminal is a predetermined value if not matching, said return control section in said server sets said return mode flag into said second license depending on said request from said terminal and restores a number of simultaneous issues of said first license when said return control section automatically restores to said return state of said second license, and said return control section in said server deletes said information on said second license in said second memory unit without restoring said number of simultaneous issues of said first license when said second license which is returned from said terminal after said expiration date/time for said terminal has already been automatically returned by said server.

18. The terminal as claimed in claim 17, wherein said reproduction unit updates said second use condition each time said reproduction unit reproduces said content.

* * * * *